US011126108B2

(12) United States Patent
Maeda

(10) Patent No.: US 11,126,108 B2
(45) Date of Patent: Sep. 21, 2021

(54) IMAGE FORMING APPARATUS AND IMAGE FORMING METHOD FOR CORRECTING A POSITION OF A TARGET IMAGE

(71) Applicant: Katsuhiko Maeda, Kanagawa (JP)

(72) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/935,392

(22) Filed: Jul. 22, 2020

(65) Prior Publication Data

US 2021/0063909 A1 Mar. 4, 2021

(30) Foreign Application Priority Data

Sep. 4, 2019 (JP) .............................. JP2019-161555

(51) Int. Cl.
*G03G 15/04* (2006.01)
*G03G 15/043* (2006.01)
*G02B 26/12* (2006.01)

(52) U.S. Cl.
CPC ....... *G03G 15/0435* (2013.01); *G02B 26/127* (2013.01); *G03G 15/04072* (2013.01); *G03G 2215/0404* (2013.01); *G03G 2215/047* (2013.01)

(58) Field of Classification Search
USPC .......................................................... 399/49
See application file for complete search history.

(56) References Cited

U.S. PATENT DOCUMENTS

| 6,249,304 | B1 | 6/2001 | Sawayama et al. |
|---|---|---|---|
| 2004/0070661 | A1 | 4/2004 | Maeda |
| 2004/0096454 | A1 | 5/2004 | Maeda |
| 2004/0160506 | A1 | 8/2004 | Maeda |
| 2004/0239747 | A1 | 12/2004 | Maeda |
| 2005/0184229 | A1 | 8/2005 | Maeda |
| 2005/0200689 | A1 | 9/2005 | Shinohara et al. |
| 2006/0045577 | A1 | 3/2006 | Maeda |
| 2006/0176363 | A1 | 8/2006 | Maeda |
| 2007/0217831 | A1 | 9/2007 | Maeda |
| 2008/0273902 | A1 | 11/2008 | Maeda |
| 2011/0228030 | A1 | 9/2011 | Maeda |

(Continued)

FOREIGN PATENT DOCUMENTS

JP 2018-155854 10/2018

*Primary Examiner* — Q Grainger
(74) *Attorney, Agent, or Firm* — IPUSA, PLLC

(57) ABSTRACT

An image forming apparatus includes an image forming device and a control device. The image forming device forms an image on a recording medium. The control device controls an image forming process. The control device includes circuitry. The circuitry changes a plurality of partial images in a target image into a certain state. The target image is to be formed on the recording medium. The plurality of partial images are to be formed peripheral to a plurality of pattern images. Each of the plurality of pattern images is to be formed at a certain position on the recording medium. The circuitry further controls the image forming device to form the target image including the changed plurality of partial images and the plurality of pattern images on the recording medium, and corrects a position of the target image based on a detection result of the formed plurality of pattern images.

14 Claims, 16 Drawing Sheets

(56) References Cited

U.S. PATENT DOCUMENTS

| | | |
|---|---|---|
| 2014/0063168 A1 | 3/2014 | Maeda et al. |
| 2014/0072317 A1 | 3/2014 | Shukuya et al. |
| 2015/0054902 A1 | 2/2015 | Maeda et al. |
| 2015/0125171 A1* | 5/2015 | Iwata ............... H04N 1/4092 399/51 |
| 2015/0316870 A1 | 11/2015 | Maeda |
| 2016/0219172 A1* | 7/2016 | Mita ............... H04N 1/0057 |
| 2018/0267422 A1 | 9/2018 | Maeda |
| 2019/0163109 A1 | 5/2019 | Maeda |

* cited by examiner

IMAGE FORMING APPARATUS AND IMAGE FORMING METHOD FOR CORRECTING A POSITION OF A TARGET IMAGE

CROSS-REFERENCE TO RELATED APPLICATION

This patent application is based on and claims priority pursuant to 35 U.S.C. § 119(a) to Japanese Patent Application No. 2019-161555 filed on Sep. 4, 2019 in the Japan Patent Office, the entire disclosure of which is hereby incorporated by reference herein.

BACKGROUND

Technical Field

The present invention relates to an image forming apparatus and an image forming method.

Description of the Related Art

In a typical image forming apparatus, an image forming position on a recording medium varies in some cases owing to variations in the transport position of the recording medium or expansion or contraction of the recording medium due to the heat in a fixing process, for example. To address such a variation in the image forming position, a technique is proposed which detects correction pattern images formed at certain positions on the recording medium and corrects the image forming position on the recording medium based on a detection result.

If an image intended to be formed (i.e., a target image) is formed near the correction pattern images formed at the certain positions on the recording medium, however, confusion between the correction pattern images and the target image may occur, preventing accurate detection of the correction pattern images and thus accurate correction of the image forming position. To avoid such a situation, parts of the target image near the correction pattern images may be eliminated (i.e., may not be formed).

According to this technique, however, the target image formed on the recording medium is partially missing, which may prevent a user of the image forming apparatus from properly recognizing the target image formed on the recording medium.

SUMMARY

In one embodiment of this invention, there is provided an improved image forming apparatus that includes, for example, an image forming device and a control device. The image forming device forms an image on a recording medium. The control device controls an image forming process. The control device includes circuitry. The circuitry changes a plurality of partial images in a target image into a certain state. The target image is to be formed on the recording medium. The plurality of partial images are to be formed peripheral to a plurality of pattern images. Each of the plurality of pattern images is to be formed at a certain position on the recording medium. The circuitry further controls the image forming device to form the target image including the changed plurality of partial images and the plurality of pattern images on the recording medium, and corrects a position of the target image based on a detection result of the formed plurality of pattern images.

In one embodiment of this invention, there is provided an improved image forming apparatus that includes, for example, image changing means, image forming means, and position correcting means. The image changing means changes a plurality of partial images in a target image into a certain state. The target image is to be formed on a recording medium. The plurality of partial images are to be formed peripheral to a plurality of pattern images. Each of the plurality of partial images is to be formed at a certain position on the recording medium. The image forming means forms the target image including the changed plurality of partial images and the plurality of pattern images on the recording medium. The position correcting means corrects a position of the target image based on a detection result of the formed plurality of pattern images.

In one embodiment of this invention, there is provided an improved image forming method that includes, for example, changing a plurality of partial images in a target image into a certain state. The target image is to be formed on a recording medium. The plurality of partial images are to be formed peripheral to a plurality of pattern images. Each of the plurality of partial images is to be formed at a certain position on the recording medium. The image forming method further includes, for example, forming the target image including the changed plurality of partial images and the plurality of pattern images on the recording medium, and correcting a position of the target image based on a detection result of the formed plurality of pattern images.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
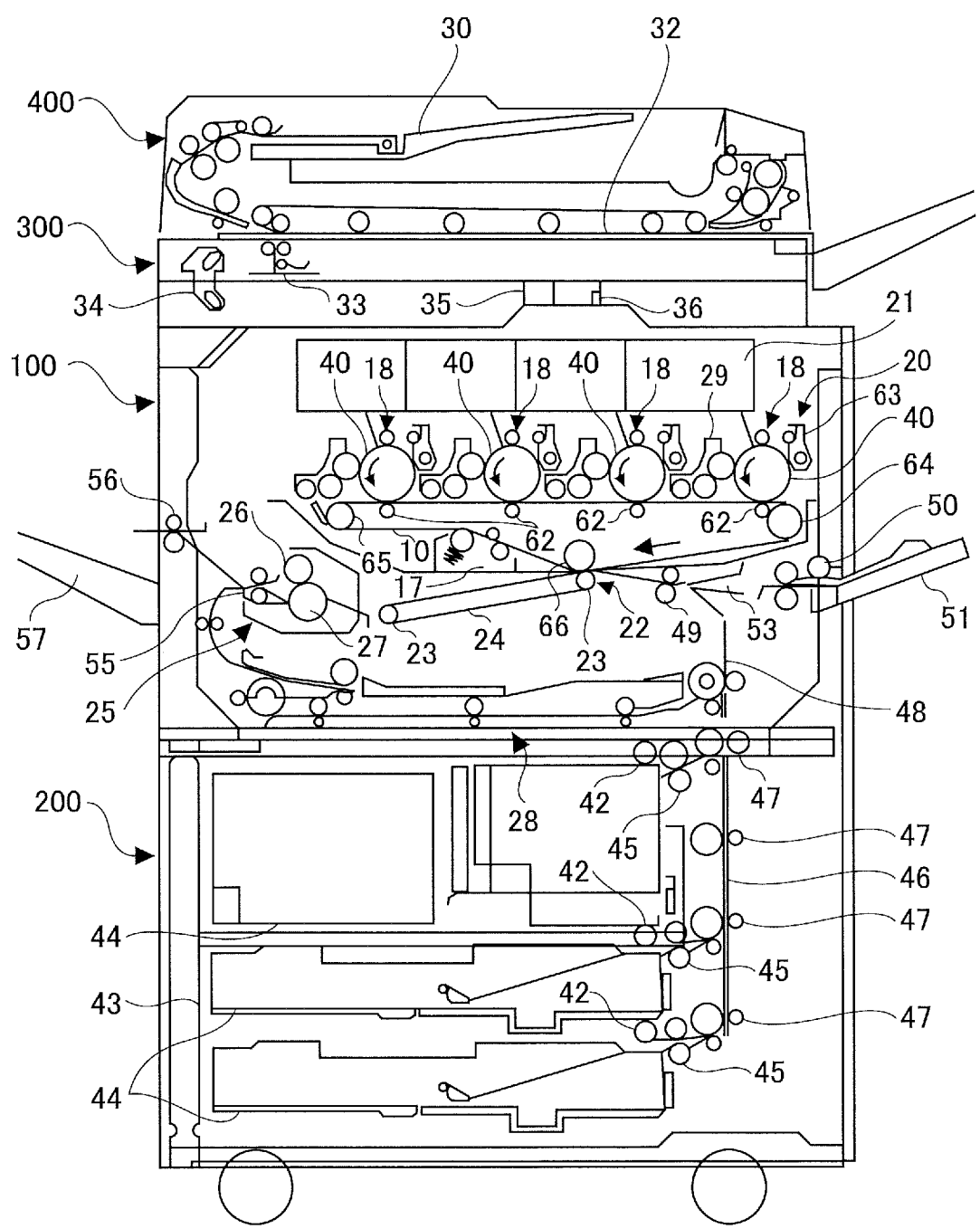
FIG. 1 is a diagram illustrating an example of the general arrangement of an image forming apparatus of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An image forming apparatus of a first embodiment of the present invention includes image changing means, image forming means, and position correcting means. The image changing means changes a plurality of partial images in a target image into a certain state. The target image is to be formed on a recording medium. The plurality of partial images are to be formed peripheral to a plurality of pattern images. Each of the plurality of pattern images is to be formed at a certain position on the recording medium. The image forming means forms the target image including the changed plurality of partial images and the plurality of pattern images on the recording medium. The position correcting means corrects a position of the target image based on a detection result of the formed plurality of pattern images.

Since the plurality of partial images in the target image to be formed peripheral to the plurality of pattern images are changed into the certain state, the confusion between the plurality of partial images and the plurality of pattern images is prevented without elimination of parts of the target image formed on the recording medium. Consequently, the plurality of pattern images for position correction are accurately detected, enabling accurate image misalignment correction based on a detection result.

As an example of the image forming apparatus of the first embodiment, an electrophotographic image forming apparatus 100 including a second transfer mechanism called a tandem system will be described below. The image forming apparatus 100 is a multifunction peripheral/printer/product (MFP) implemented as a housing equipped with functions such as a copy function, a print function, and a facsimile (FAX) function.

An example of the general arrangement of the image forming apparatus 100 will be described with FIG. 1.

FIG. 1 is a diagram illustrating an example of the general arrangement of the image forming apparatus 100. The image forming apparatus 100 includes, at the center thereof, an intermediate transfer device that includes an intermediate transfer belt 10. The intermediate transfer belt 10 is an endless belt stretched around three support rollers, i.e., a first support roller 64, a second support roller 65, and a third support roller 66, to be driven to rotate clockwise.

The image forming apparatus 100 further includes, on the right side of the second support roller 65, an intermediate transfer member cleaning device 17 that removes residual toner remaining on the intermediate transfer belt 10 after an image transfer process.

The image forming apparatus 100 further includes four image forming units 20, i.e., an image forming unit 20 for forming a yellow (Y) image, an image forming unit 20 for forming a magenta (M) image, an image forming unit 20 for forming a cyan (C) image, and an image forming unit 20 for forming a black (K) image. The image forming units 20 for the respective colors face a part of the intermediate transfer belt 10 disposed between the first support roller 64 and the second support roller 65, and are arranged along the running direction of the intermediate transfer belt 10.

The image forming units 20 for the respective colors are similar in configuration except that the image forming units 20 use toners of different colors. In the following description and drawings, therefore, the reference signs Y, M, C, and K, which represent the colors of the toners used in the image forming units 20, will be omitted where appropriate.

Each of the image forming units 20 includes components such as a photoconductor drum 40, a charging device 18, a developing device 29, a transfer device 62, and a cleaning device 63 for the corresponding color. In FIG. 1, reference numerals are limited to the components of the image forming unit 20 for the K color on the right side of the drawing to simplify the illustration. However, the same reference numerals similarly apply to the components of the image forming units 20 for the Y, M, and C colors. The image forming units 20 are removably installed in the image forming apparatus 100.

The image forming apparatus 100 further includes four light beam scanners 21 above the four image forming units 20. The light beam scanners 21 are examples of an optical writing device or optical writing means. The light beam scanners 21 irradiate the photoconductor drums 40 for the respective colors with light beams (e.g., laser light) for forming images, to thereby form electrostatic latent images on the photoconductor drums 40 for the respective colors in accordance with image data.

The electrostatic latent images on the photoconductor drums 40 for the respective colors are developed into toner images of the respective colors by the developing devices 29. The developed toner images of the respective colors are then first-transferred onto the intermediate transfer belt 10 to be superimposed upon each other. Thereby, a color toner image is formed on the intermediate transfer belt 10. The color toner image is then carried by the intermediate transfer belt 10 and moved (i.e., transported) in the moving direction of the intermediate transfer belt 10. The configuration of the image forming units 20 will be described in more detail later with FIG. 2.

The image forming apparatus 100 further includes a second transfer device 22 under the intermediate transfer belt 10. The second transfer device 22 includes two rollers 23 and a second transfer belt 24, which is an endless belt stretched around the two rollers 23. The second transfer device 22 is arranged to lift and press the intermediate transfer belt 10 against the third support roller 66. With the second transfer belt 24, the color toner image formed on the intermediate transfer belt 10 is second-transferred onto a recording medium P (see FIG. 2).

The image forming apparatus 100 further includes a fixing device 25 on the left side of the second transfer device 22. In the fixing device 25, the color toner image second-transferred to the recording medium P transported to the fixing device 25 is fixed on the recording medium P. The fixing device 25 includes a fixing roller 26 and a pressure roller 27, which are endless belts. With the heat and pressure applied by the fixing roller 26 and the pressure roller 27, the color toner image transferred to a surface of the recording medium P is fixed thereon.

The image forming apparatus 100 further includes a sheet reversing device 28 below the second transfer device 22 and the fixing device 25. The sheet reversing device 28 reverses and transports the recording medium P to form an image on a rear surface of the recording medium P immediately after an image is formed on a front surface of the recording medium P.

A process of forming an image on the recording medium P in the image forming apparatus 100 will be described.

When a document is placed on a document feeding tray 30 of an automatic document feeder (ADF) 400, the image forming apparatus 100 controls the ADF 400 to transport the document to a contact glass 32 in response to pressing of a copy start button included in an operation device of the image forming apparatus 100. When the document is not placed on the document feeding tray 30 but is manually placed on the contact glass 32, the image forming apparatus 100 drives an image reading device 300 including a first carriage 33 and a second carriage 34 to read the document.

In the image reading device 300, a light source included in the first carriage 33 emits light to the contact glass 32. The light is reflected by a surface of the document, and is reflected toward the second carriage 34 by a mirror of the first carriage 33. The reflected light is further reflected by mirrors of the second carriage 34. Then, the reflected light from the surface of the document is formed into an image on an imaging surface of a charge coupled device (CCD) 36 by an image forming lens 35. The CCD 36 is a read sensor that captures the image of the surface of the document. Then, based on image signals of the image captured by the CCD 36, image data of the Y, M, C, and K colors is generated.

In response to pressing of a print start button of the operation device, in response to receipt of an image forming instruction from an external apparatus such as a personal computer (PC), or in response to receipt of a FAX output instruction, for example, the image forming apparatus 100 starts driving the intermediate transfer belt 10 to rotate, and controls the devices of the image forming units 20 to prepare for an image forming process.

The image forming apparatus 100 then starts the image forming process of forming the images of the respective colors. Each of the photoconductor drums 40 for the respective colors is irradiated with laser light modulated based on the image data of the corresponding color. Thereby, the electrostatic latent images are formed on the photoconductor drums 40. Then, the toner images of the respective colors developed from the electrostatic latent images are superimposed upon each other on the intermediate transfer belt 10 to form one toner image.

Then, the recording medium P is transported to the second transfer device 22 such that a leading edge of the recording medium P enters the second transfer device 22 in synchronization with the arrival of a leading edge of the toner image on the intermediate transfer belt 10 to the second transfer device 22. Then, the toner image on the intermediate transfer belt 10 is second-transferred onto the recording medium P by the second transfer device 22. The recording medium P having the toner image second-transferred thereto is transported to the fixing device 25, in which the toner image is fixed on the recording medium P.

The feeding of the recording medium P to a second transfer position (i.e., the position at which the second transfer device 22 faces the third support roller 66) will be described.

In a sheet feeding device 200, one of sheet feeding rollers 42 is driven to rotate to feed recording media P from one of a plurality of sheet feeding trays 44 included in a sheet feeding section 43. Then, one of the recording media P is separated from the remaining recording media P by a corresponding separation roller 45, sent to a transport roller section 46, and transported by a corresponding transport roller 47. The recording medium P is then guided by a transport roller section 48 in the image forming apparatus 100 and hit against a registration roller 49 in the transport roller section 48 to be temporarily stopped. Then, the recording medium P is transported to the second transfer device 22 at an appropriate time for the second transfer process, as described above.

Alternatively, the recording medium P may be inserted (i.e., fed) to a manual sheet feeding tray 51 by the user. If recording media P are inserted in the manual sheet feeding tray 51 by the user, the image forming apparatus 100 drives a sheet feeding roller 50 to rotate to separate one of the recording media P on the manual sheet feeding tray 51 from the remaining recording media P and bring the separated recording medium P into a manual sheet feeding path 53. Then, in a similar manner as described above, the recording medium P is hit against the registration roller 49 to be temporarily stopped, and is transported to the second transfer device 22 at an appropriate time for the above-described second transfer process.

The recording medium P subjected to the fixing process in the fixing device 25 and ejected therefrom is guided to an ejection roller 56 by a switching pawl 55, and is ejected by the ejection roller 56 to be stacked on a sheet ejection tray 57. Alternatively, the recording medium P is guided to the sheet reversing device 28 by the switching pawl 55. The recording medium P is then reversed and guided back to the second transfer position by the sheet reversing device 28. Thereafter, an image is formed on the rear surface of the recording medium P, and the recording medium P is ejected onto the sheet ejection tray 57 by the ejection roller 56.

The residual toner remaining on the intermediate transfer belt 10 after the image transfer process is removed by the intermediate transfer member cleaning device 17 to prepare the intermediate transfer belt 10 for the next image forming process.

The image forming apparatus 100 thus forms a color image on the recording medium P.

A configuration example of the image forming units 20 of the image forming apparatus 100 will be described with FIG. 2.

Figure 2:
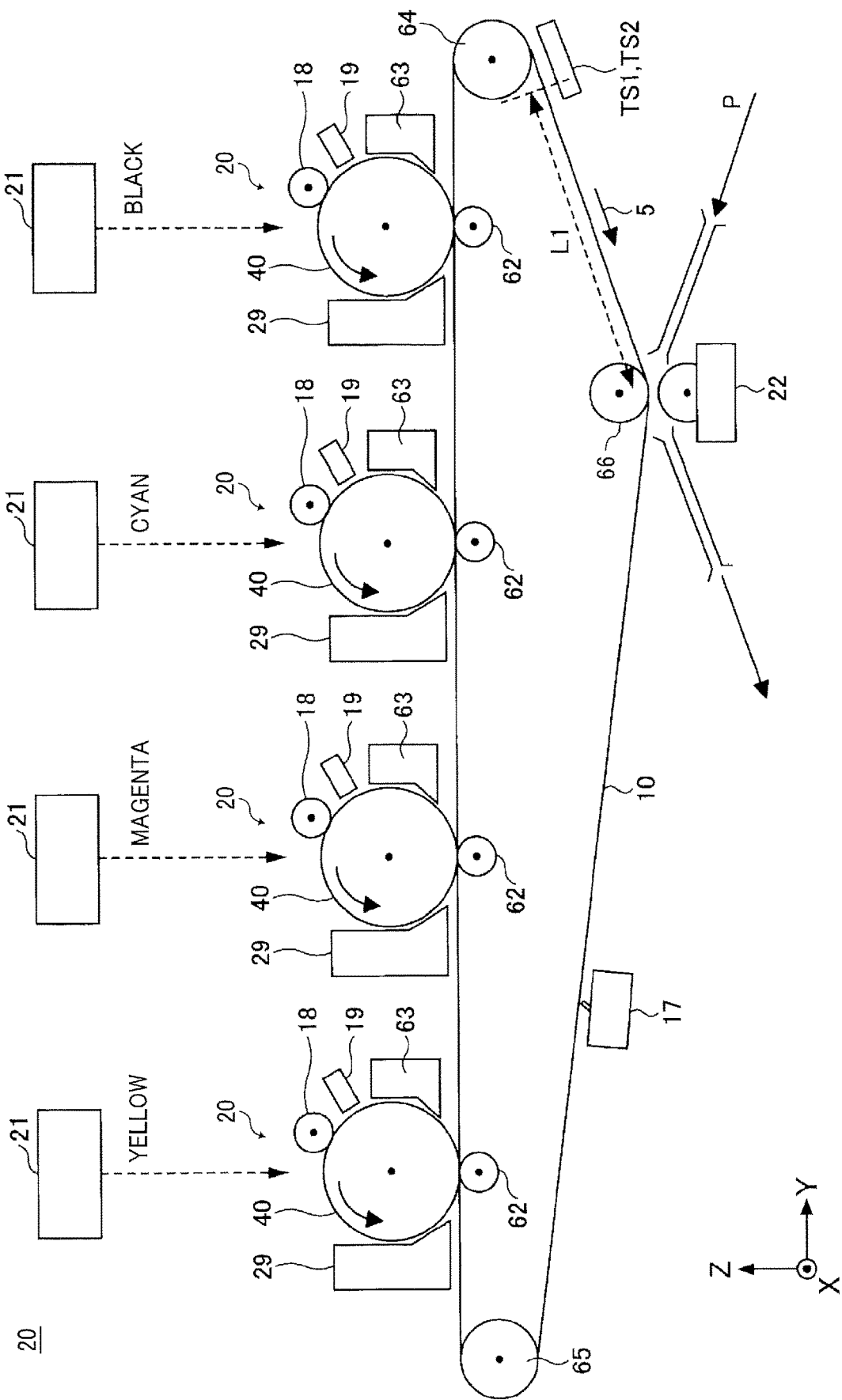
FIG. 2 is a diagram illustrating a configuration example of image forming units in the image forming apparatus of the first embodiment.

FIG. 2 is a diagram illustrating a configuration example of the image forming units 20 of the image forming apparatus 100. As described above, the image forming apparatus 100 includes the four image forming units 20 and the four light beam scanners 21 to form the color image including the images of the four colors (i.e., yellow, magenta, cyan, and black) superimposed upon each other.

Each of the light beam scanners 21 is driven to selectively emit a light beam modulated in accordance with the image data. The emitted light beam is deflected by a polygon mirror 213, passed through an fθ lens 214, and reflected by a reflecting mirror 215 (see FIG. 4) to scan a surface of the corresponding photoconductor drum 40. The polygon mirror 213 is driven to rotate by a polygon motor. The light beam scanner 21 will be described in more detail later with FIG. 4.

Each of the image forming units 20 for the respective colors includes the charging device 18, the developing device 29, the transfer device 62, the cleaning device 63, and a discharger 19, which are disposed around the photoconductor drum 40.

Through charging, exposure, development, and transfer processes of an electrophotographic image forming operation, the image forming apparatus 100 sequentially forms the toner image of the first color (i.e., yellow), the toner image of the second color (i.e., magenta), the toner image of the third color (i.e., cyan), and the toner image of the fourth color (i.e., black) on the intermediate transfer belt 10. Thereby, the color toner image is formed in which the images of the four colors are superimposed upon each other. Then, the color toner image formed on the intermediate transfer belt 10 is transferred onto the transported recording medium P by the second transfer device 22. Thereby, the color toner image including the superimposed toner images of the four colors is formed on the recording medium P. The color toner image on the recording medium P is then fixed thereon by the fixing device 25 illustrated in FIG. 1.

The image forming apparatus 100 further includes toner image sensors TS1 and TS2 downstream of the first support roller 64 in the running direction of the intermediate transfer belt 10 indicated by an arrow 5 in FIG. 2. The toner image sensors TS1 and TS2 detect patterns for detecting the misalignment of the toner image formed on the intermediate transfer belt 10. To simply the description, the patterns for detecting the misalignment of the toner image will hereinafter be referred to as the toner image correction patterns.

The toner image sensors TS1 and TS2 are reflective optical sensors disposed at two locations in the direction of the X-axis perpendicular to the running direction of the intermediate transfer belt 10. Each of the toner image sensors TS1 and TS2 emits light and outputs a voltage signal according to the optical intensity of light reflected from the emitted light.

The optical intensity of the reflected light varies between areas on the surface of the intermediate transfer belt 10 formed with the toner image correction patterns and areas on the surface of the intermediate transfer belt 10 not formed with the toner image correction patterns. The image forming apparatus 100 therefore detects the toner image correction patterns based on the voltage signals (i.e., detection signals) output from the toner image sensors TS1 and TS2 in accordance with the optical intensity of the reflected light.

The image forming apparatus 100 receives input of the detection signals from the toner image sensors TS1 and TS2, and corrects misalignment in the main scanning direction and misalignment in the sub-scanning direction between the toner images of the respective colors formed on the intermediate transfer belt 10 and magnification errors of the toner images in the main scanning direction. Further, on the recording medium P having the toner images second-transferred thereto from the intermediate transfer belt 10, the image forming apparatus 100 corrects misalignment in the main scanning direction and misalignment in the sub-scanning direction between the images of the respective colors and magnification errors of the toner images in the main scanning direction.

Herein, the main scanning direction refers to the direction in which the light beam scanner 21 scans the surface of the photoconductor drum 40 with the light beam, i.e., the positive direction of the X-axis in FIG. 2. Further, the sub-scanning direction corresponds to a direction perpendicular to the main scanning direction, i.e., the running direction of the intermediate transfer belt 10. In FIG. 2, L1 represents the distance from the toner image sensors TS1 and TS2 to the second transfer device 22 in the running direction of the intermediate transfer belt 10.

The image forming position on the recording medium P may vary owing to variations in the transport position of the recording medium P or extension or contraction of the recording medium P due to the heat in the fixing process, for example. Further, when an image is formed on the rear surface of the recording medium P in duplex printing after an image is formed on the front surface of the recording medium P, the image forming position may be different between the front surface and the rear surface.

Figure 3:
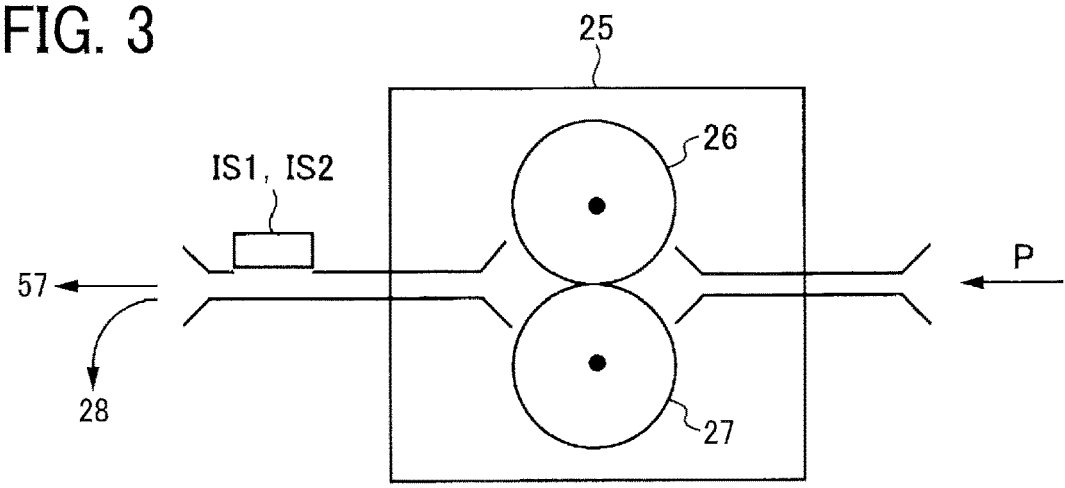
FIG. 3 is a diagram illustrating an arrangement example of image misalignment sensors in the image forming apparatus of the first embodiment.

Therefore, the image forming apparatus 100 forms pattern images for image misalignment correction at certain positions on the recording medium P, and detects the pattern images with image misalignment sensors IS1 and IS2 (see FIG. 3). Then, based on a detection result, the image forming apparatus 100 corrects the image misalignment on the recording medium P. The certain positions on the recording medium P for forming the pattern images are four corners of the recording medium P, for example. To simplify the description, the pattern images for image misalignment correction will be simply referred to as the correction pattern images. The correction pattern images are an example of a plurality of pattern images.

An arrangement example of the image misalignment sensors IS1 and IS2 will be described with FIG. 3.

FIG. 3 is a diagram illustrating an arrangement example of the image misalignment sensors IS1 and IS2 in the image forming apparatus 100. As illustrated in FIG. 3, the image misalignment sensors IS1 and IS2 are disposed near the exit of the fixing device 25.

Each of the image misalignment sensors IS1 and IS2 is an image reading sensor such as a CCD sensor or a contact image sensor (CIS). The image misalignment sensors IS1 and IS2 are disposed at two locations near two opposite end portions of the recording medium P in a direction perpendicular to the transport direction of the recording medium P. The image misalignment sensors IS1 and IS2 capture (i.e., detect) the correction pattern images formed at the four corners of the recording medium P, and output captured image data (an example of a detection result) to a printer controller 1 (see FIG. 5) of the image forming apparatus 100.

A configuration example of the light beam scanners 21 of the image forming apparatus 100 will be described with FIG. 4.

Figure 4:
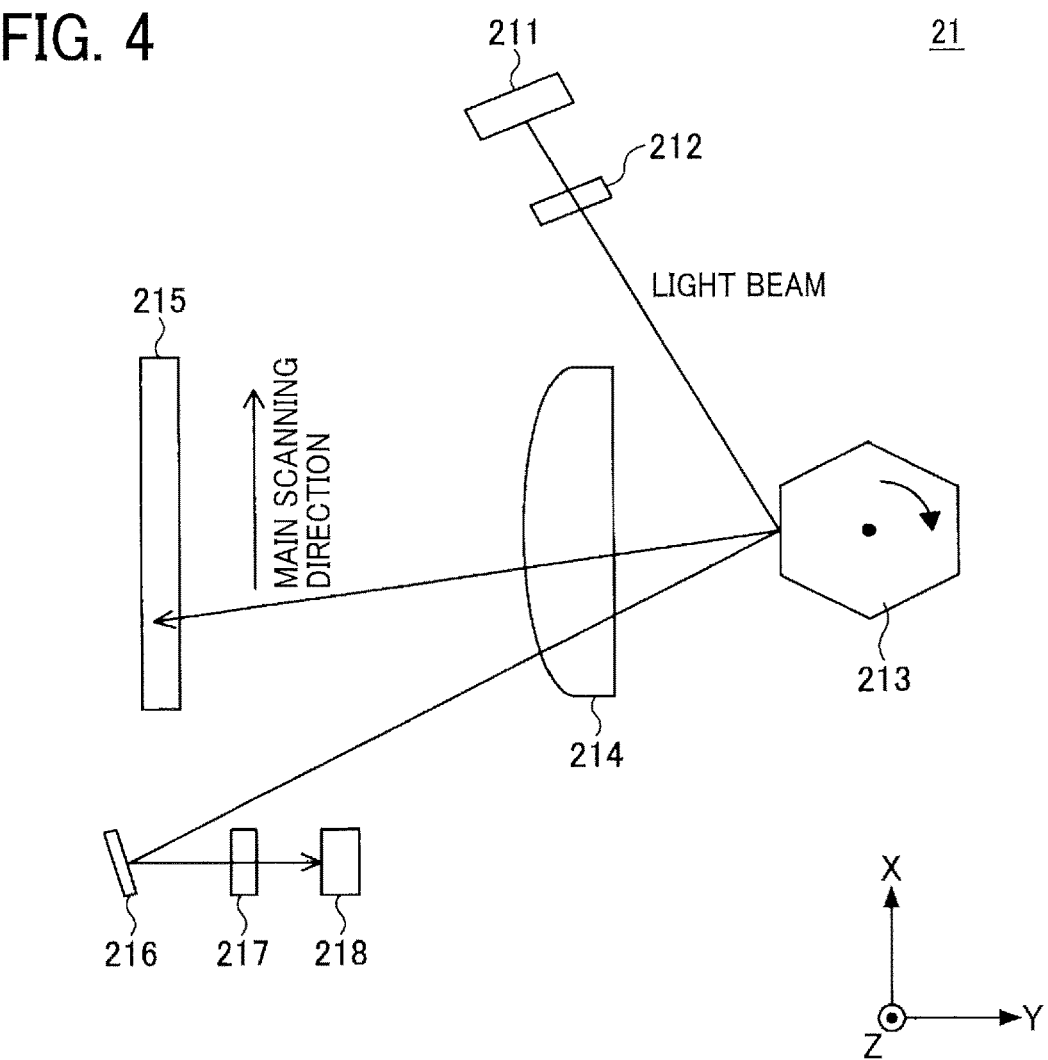
FIG. 4 is a diagram illustrating a configuration example of a light beam scanner in the image forming apparatus of the first embodiment.

FIG. 4 is a diagram illustrating a configuration example of one of the light beam scanners 21. FIG. 4 is a top view of one of the light beam scanners 21 in FIG. 2 as viewed in the positive direction of the Z-axis. The light beam scanner 21 illustrated in FIG. 4 corresponds to one of the four colors. The light beam scanners 21 for the other three colors are similar in configuration to the light beam scanner 21 for the one of the four colors illustrated in FIG. 4. The following description will therefore be limited to the light beam scanner 21 for the one of the four colors, and description of the light beam scanners 21 for the other three colors will be omitted.

The light beam emitted from a laser diode (LD) 211 is shaped by a cylinder lens 212, and is incident on the polygon mirror 213. The light beam is then deflected with the rotation of the polygon mirror 213, and is passed through the fθ lens 214. Then, the light beam is reflected by the reflecting mirror 215 to irradiate the photoconductor drum 40 with the light beam. Since the deflection angle changes with the rotation of the polygon mirror 213, the surface of the photoconductor drum 40 is scanned with the light beam in the main scanning direction (i.e., the positive direction of the X-axis). In the following description, the light beam thus used in the scanning may also be referred to as the scanning light.

On a writing start side in the main scanning direction (i.e., on the negative side of the X-axis), a synchronization mirror 216, a synchronization lens 217, and a synchronization sensor 218 are disposed. Herein, the term "writing" is synonymous with the term "exposure." On the writing start side, the scanning light passed through the fθ lens 214 is reflected by the synchronization mirror 216, and is condensed on a light receiving surface of the synchronization sensor 218 by the synchronization lens 217. The synchronization sensor 218, which is implemented by a photodiode, for example, outputs an electrical signal according to the intensity of the received light.

The scanning light reaches the light receiving surface of the synchronization sensor 218 with a predetermined period according to the rotation of the polygon mirror 213. Therefore, the electrical signal output by the synchronization sensor 218 when the scanning light reaches the light receiving surface of the synchronization sensor 218 is usable as a synchronization detection signal for synchronizing the time of starting the writing with the scanning light. Based on the synchronization detection signal from the synchronization sensor 218, the light beam scanner 21 determines the time of starting the writing in the main scanning direction.

A hardware configuration and functions of the image forming apparatus 100 will be described with FIG. 5.

Figure 5:
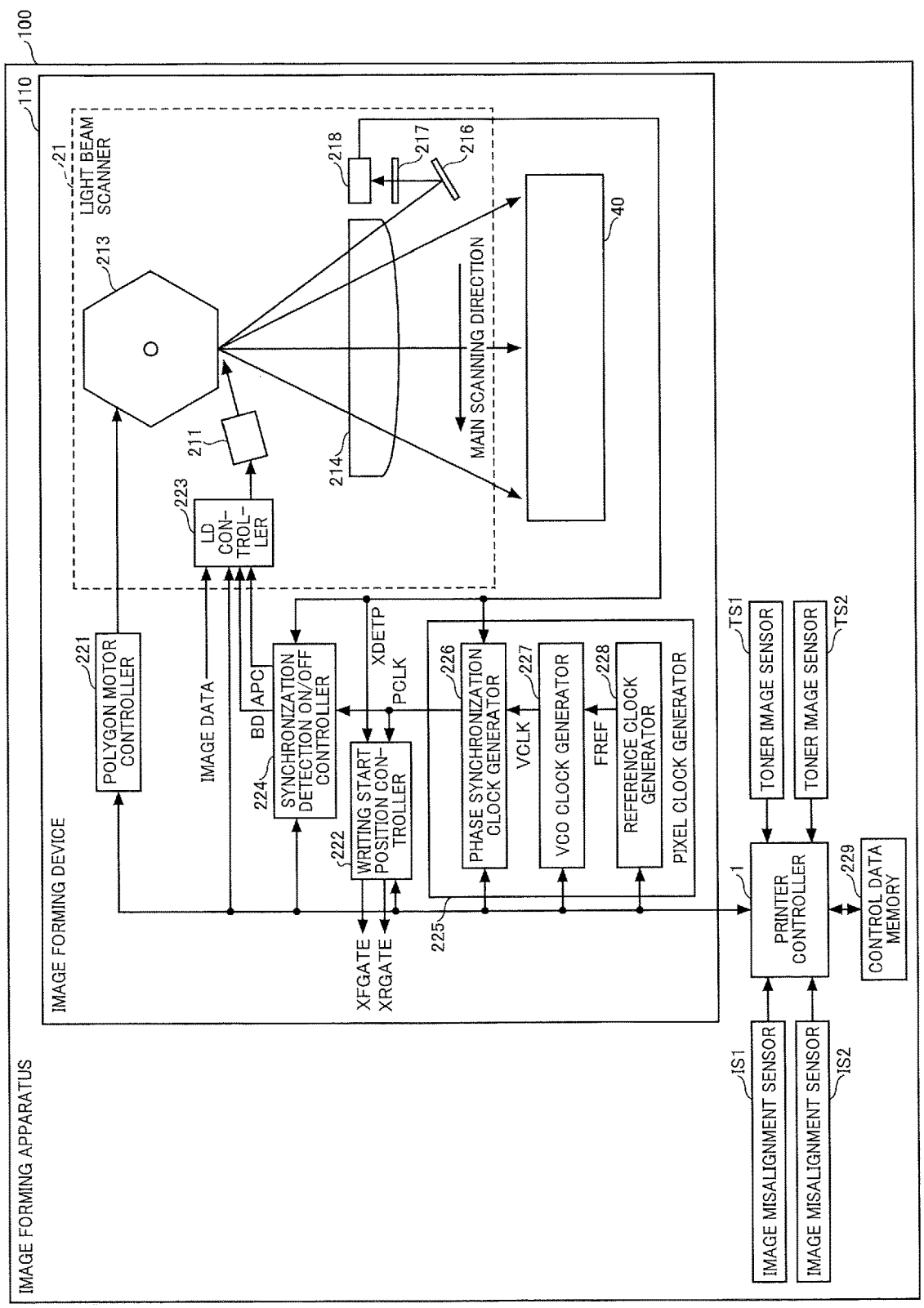
FIG. 5 is a block diagram illustrating an example of the hardware configuration of the image forming apparatus of the first embodiment.

FIG. 5 is a block diagram illustrating an example of the hardware configuration of the image forming apparatus 100. FIG. 5 illustrates an image forming device 110 of the image forming apparatus 100, specifically a part of the image forming device 110 for one of the four colors. The image forming device 110 has the same configuration and functions for the other three colors. The following description will therefore be limited to the part of the image forming device 110 for the one of the four colors, and description of parts of the image forming device 110 for the other three colors will be omitted. The image forming device 110 is an example of an image forming device or image forming means.

As illustrated in FIG. 5, the image forming apparatus 100 includes the image forming device 110, the printer controller 1 (an example of a control device), the toner image sensors TS1 and TS2, and the image misalignment sensors IS1 and IS2. The image forming device 110 and the printer controller 1 are communicably connected to each other.

The image forming device 110 includes the light beam scanner 21, a polygon motor controller 221, a writing start position controller 222, an LD controller 223, a synchronization detection on/off controller 224, and a pixel clock generator 225.

Each of the polygon motor controller 221, the writing start position controller 222, the LD controller 223, the synchronization detection on/off controller 224, and the pixel clock generator 225 is implemented by an electronic circuit such as an application specific integrated circuit (ASIC) or a field programmable gate array (FPGA), but is not limited thereto and may be implemented by a central processing unit (CPU), for example.

The printer controller 1 is implemented by a CPU, a random access memory (RAM), a read only memory (ROM), and an external interface (I/F), for example. The printer controller 1 is connected to the image misalignment sensors IS1 and IS2, the toner image sensors TS1 and TS2, and a control data memory 229. Alternatively, the printer controller 1 may be implemented by an electronic circuit such as an ASIC.

The printer controller 1 executes a predetermined process based on outputs from the toner image sensors TS1 and TS2 and the image misalignment sensors IS1 and IS2. Functions of the printer controller 1 will be described in detail later.

Functions of components of the image forming device 110 will be described with FIG. 5.

When a part of the scanning light passes above the synchronization sensor 218, the synchronization sensor 218 outputs a synchronization detection signal XDETP to each of the pixel clock generator 225, the synchronization detection on/off controller 224, and the writing start position controller 222.

The pixel clock generator 225 generates a pixel clock signal PCLK, which is synchronized with the synchronization detection signal XDETP. The pixel clock generator 225 then outputs the pixel clock signal PCLK to each of the writing start position controller 222 and the synchronization detection on/off controller 224.

To detect the synchronization detection signal XDETP first, the synchronization detection on/off controller 224 outputs an LD force-on/off signal BD to force the LD 211 on. After detecting the synchronization detection signal XDETP, the synchronization detection on/off controller 224 turns on the LD 211 with the synchronization detection signal XDETP and the pixel clock signal PCLK with timing that enables reliable detection of the synchronization detection signal XDETP without causing flare. After detecting the synchronization detection signal XDETP, the synchronization detection on/off controller 224 generates the LD force-on/off signal BD to force the LD 211 off, and outputs the LD force-on/off signal BD to the LD controller 223.

With the synchronization detection signal XDETP and the pixel clock signal PCLK, the synchronization detection on/off controller 224 further generates a light amount control timing signal APC for each of the LDs 211 for the four colors, and outputs the light amount control timing signal APC to the LD controller 223. The light amount control timing signal APC is output during a non-writing period, i.e., a period outside a writing (i.e., exposure) period of the photoconductor drum 40 with the scanning light. Thereby, the light amount of the light beam emitted from the LD 211 is controlled to a predetermined light amount during the non-writing period.

The LD controller 223 controls the turn-on and turn-off of the LD 211 in accordance with the image data synchronized with the LD force-on/off signal BD, the light amount control timing signal APC, and the pixel clock signal PCLK. Thereby, the light beam is emitted from the LD 211, deflected by the polygon mirror 213, and directed to the photoconductor drum 40 through the fθ lens 214 to scan the surface of the photoconductor drum 40.

The polygon motor controller 221 controls the polygon mirror 213 to rotate at a predetermined rotation rate based on a control signal from the printer controller 1.

The writing start position controller 222 sets a main scanning gate signal XRGATE and a sub-scanning gate signal XFGATE based on signals such as the synchronization detection signal XDETP, the pixel clock signal PCLK, and a control signal from the printer controller 1. The main scanning gate signal XRGATE and the sub-scanning gate signal XFGATE determine a writing start time and a writing width (i.e., the width of the toner image).

The pixel clock generator 225 includes a phase synchronization clock generator 226, a voltage controller oscillator (VCO) clock generator 227, and a reference clock generator 228.

The phase synchronization clock generator 226 receives input of a VCO clock signal VCLK from the VCO clock generator 227 and the synchronization detection signal XDETP. The phase synchronization clock generator 226 further outputs the pixel clock signal PCLK, which is synchronized with the synchronization detection signal XDETP, to the synchronization detection on/off controller 224, for example.

The reference clock generator 228 generates a reference clock signal FREF. The VCO clock generator 227 generates the VCO clock signal VCLK.

The toner image sensors TS1 and TS2 output the respective detection signals to the printer controller 1. The printer controller 1 acquires correction data in accordance with misalignment amounts acquired based on the detection signals input from the toner image sensors TS1 and TS2. The printer controller 1 outputs the acquired correction data to the writing start position controller 222, the pixel clock generator 225, and the control data memory 229 to set or update the correction data therein. The writing start position controller 222 executes control in accordance with the correction data. The pixel clock generator 225 generates the pixel clock signal PCLK in accordance with the correction data.

The control data memory 229, which is implemented by a hard disk drive (HDD) of the image forming apparatus 100, stores the correction data. The correction data stored in the control data memory 229 is read in the image forming process.

A detailed configuration of the VCO clock generator 227 will be described with FIG. 6.

Figure 6:
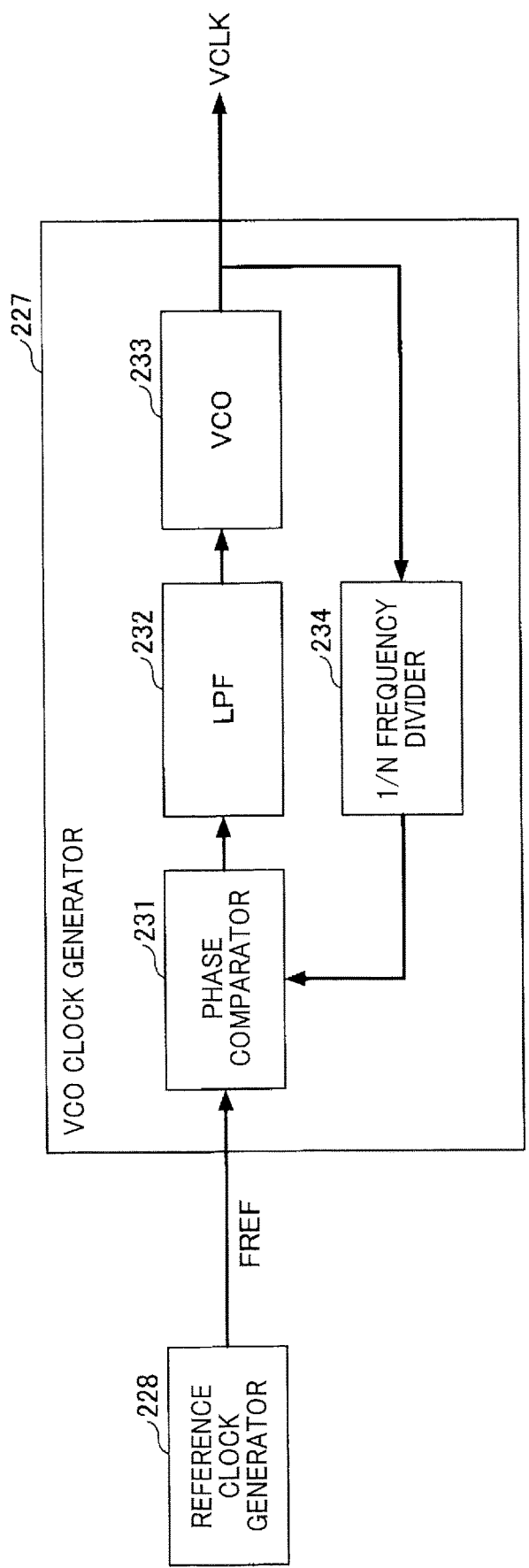
FIG. 6 is a block diagram illustrating a configuration example of a voltage controller oscillator (VCO) clock generator in the image forming apparatus of the first embodiment.

FIG. 6 is a block diagram illustrating a configuration example of the VCO clock generator 227 of the image forming apparatus 100. As illustrated in FIG. 6, the VCO clock generator 227 includes a phase comparator 231, a low pass filter (LPF) 232, a VCO 233, and a 1/N frequency divider 234.

The phase comparator 231 receives input of the reference clock signal FREF from the reference clock generator 228 and a clock signal with the frequency thereof divided into 1/N by the 1/N frequency divider 234. The phase comparator 231 further compares the respective falling edge phases of the two input signals (i.e., the reference clock signal FREF and the clock signal from the 1/N frequency divider 234), and outputs an error component with a predetermined current.

The LPF 232 removes a high-frequency component from the output from the phase comparator 231, and outputs a direct-current voltage.

Based on the output from the LPF 232, the VCO 233 outputs the VCO clock signal VCLK with a predetermined frequency.

The 1/N frequency divider 234 divides the frequency of the input VCO clock signal VCLK into 1/N with a set frequency division ratio N.

The frequency division ratio N and the frequency of the reference clock signal FREF are settable based on a control signal from the printer controller 1. With the pixel clock generator 225 set to change the frequency of the reference clock signal FREF and the value of the frequency division ratio N, therefore, the frequency of the VCO clock signal VCLK is changed.

An example of the detailed configuration of the writing start position controller 222 will be described with FIG. 7.

Figure 7:
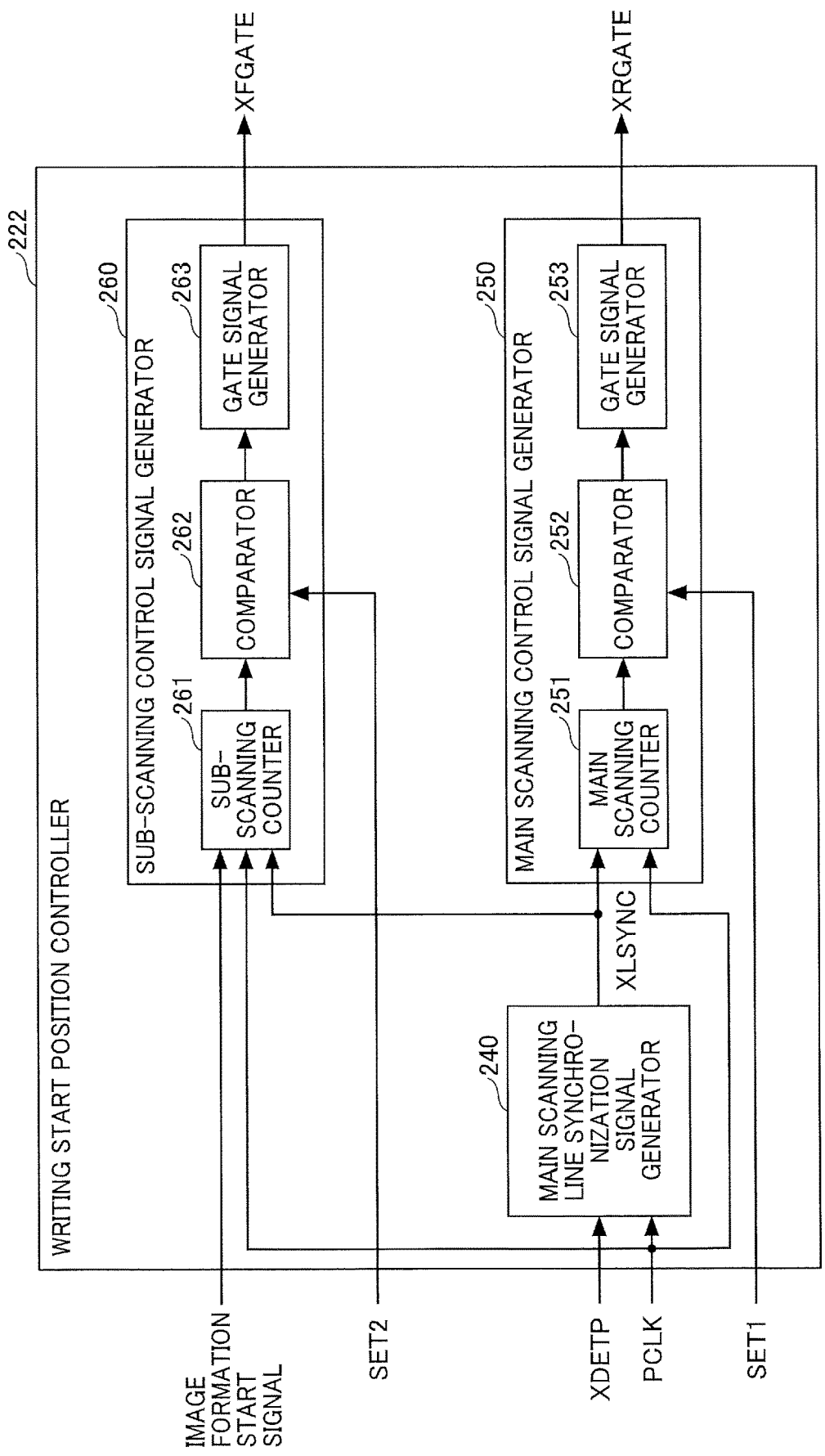
FIG. 7 is a block diagram illustrating a configuration example of a writing start position controller in the image forming apparatus of the first embodiment.

FIG. 7 is a block diagram illustrating a configuration example of the writing start position controller 222 of the image forming apparatus 100. As illustrated in FIG. 7, the writing start position controller 222 includes a main scanning line synchronization signal generator 240, a main scanning control signal generator 250, and a sub-scanning control signal generator 260.

The main scanning line synchronization signal generator 240 generates a counter drive signal XLSYNC for operating a main scanning counter 251 of the main scanning control signal generator 250 and a sub-scanning counter 261 of the sub-scanning control signal generator 260.

The main scanning control signal generator 250 generates the main scanning gate signal XRGATE for determining an image signal capture time (i.e., a writing start time) in the main scanning direction. The sub-scanning control signal generator 260 generates the sub-scanning gate signal XFGATE for determining an image signal capture time (i.e., a writing start time) in the sub-scanning direction.

The main scanning control signal generator 250 includes the main scanning counter 251, a comparator 252, and a gate signal generator 253. The main scanning counter 251 operates with the counter drive signal XLSYNC and the pixel clock signal PCLK. The comparator 252 outputs a result of comparison between a first set value SET1 (i.e., the correction data) input from the control data memory 229 via the printer controller 1 and the counter value of the main scanning counter 251. The gate signal generator 253 generates the main scanning gate signal XRGATE based on the comparison result input from the comparator 252.

The sub-scanning control signal generator 260 includes the sub-scanning counter 261, a comparator 262, and a gate signal generator 263. The sub-scanning counter 261 operates with an image formation start signal from the printer controller 1, the counter drive signal XLSYNC, and the pixel clock signal PCLK. The comparator 262 outputs a result of comparison between a second set value SET2 (i.e., the correction data) input from the control data memory 229 via the printer controller 1 and the counter value of the sub-scanning counter 261. The gate signal generator 263 generates the sub-scanning gate signal XFGATE based on the comparison result input from the comparator 262.

The writing start position controller 222 corrects the writing start position in the main scanning direction for each period of the pixel clock signal PCLK, i.e., for each dot, and corrects the writing start position in the sub-scanning direction for each period of the counter drive signal XLSYNC, i.e., for each line. The correction data in the main scanning direction and the correction data in the sub-scanning direction are both stored in the control data memory 229.

A writing start position control operation performed by the image forming apparatus 100 will be described with FIG. 8. The following description will be given of an example in which each of the synchronization detection signal XDETP, the counter drive signal XLSYNC, the main scanning gate signal XRGATE, and the sub-scanning gate signal XFGATE is a low-active signal that is enabled at low level.

Figure 8:
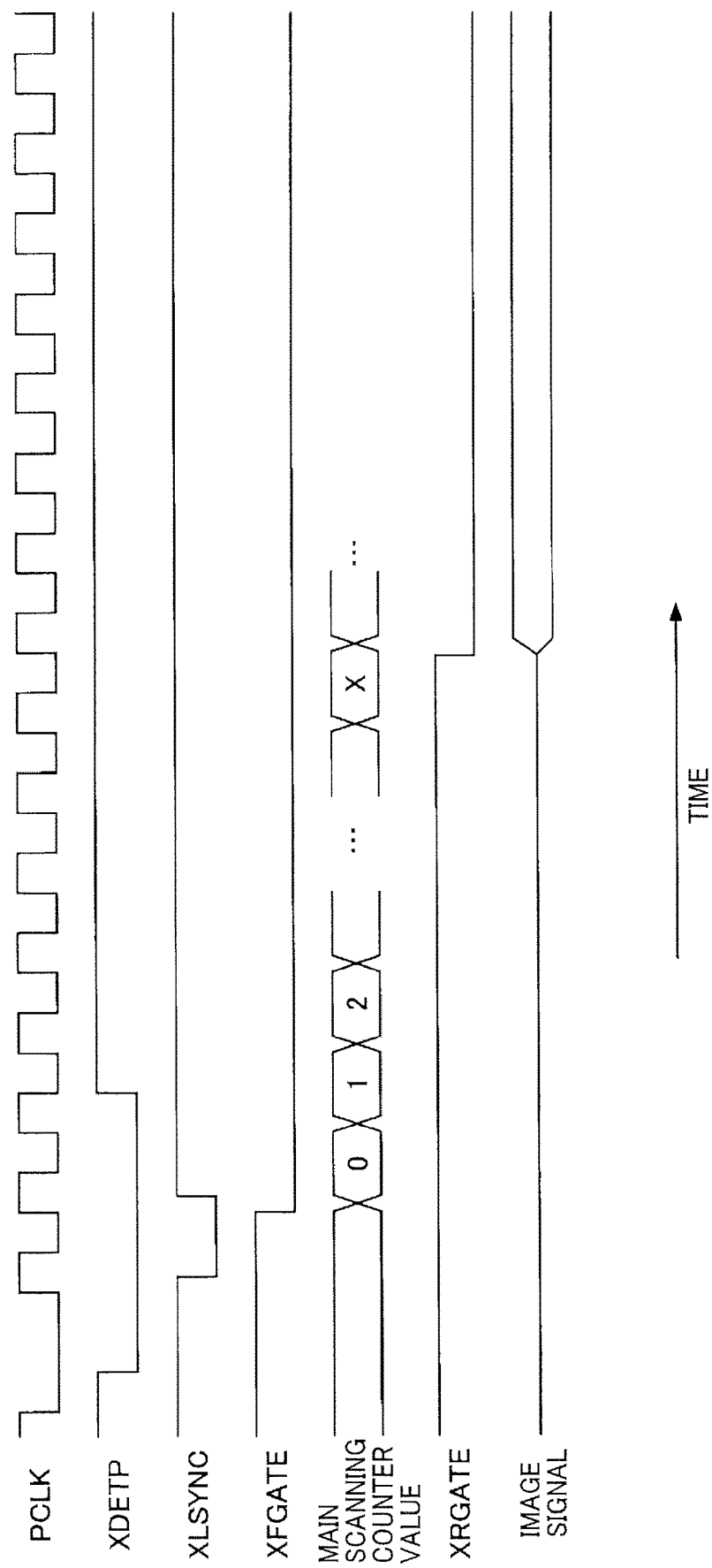
FIG. 8 is a timing chart illustrating writing start control in a main scanning direction performed by the image forming apparatus of the first embodiment.

FIG. 8 is a timing chart illustrating an example of writing start position control in the main scanning direction performed by the image forming apparatus 100. With the counter drive signal XLSYNC, the main scanning counter 251 is reset. That is, the count value of the main scanning counter 251 in FIG. 7 is reset. With the pixel clock signal PCLK, the main scanning counter 251 counts up the count value. When the count value of the main scanning counter 251 reaches the first set value SET1, the comparator 252 for main scanning outputs a signal representing the comparison result. In the present example, the first set value SET1 is represented as "X."

In response to output from the comparator 252 for main scanning of the signal indicating that the count value of the main scanning counter 251 has reached the first set value SET1, the main scanning control signal generator 250 sets the main scanning gate signal XRGATE to low level. The main scanning gate signal XRGATE is set to low level during a period corresponding to the width of the toner image in the main scanning direction.

Figure 9:
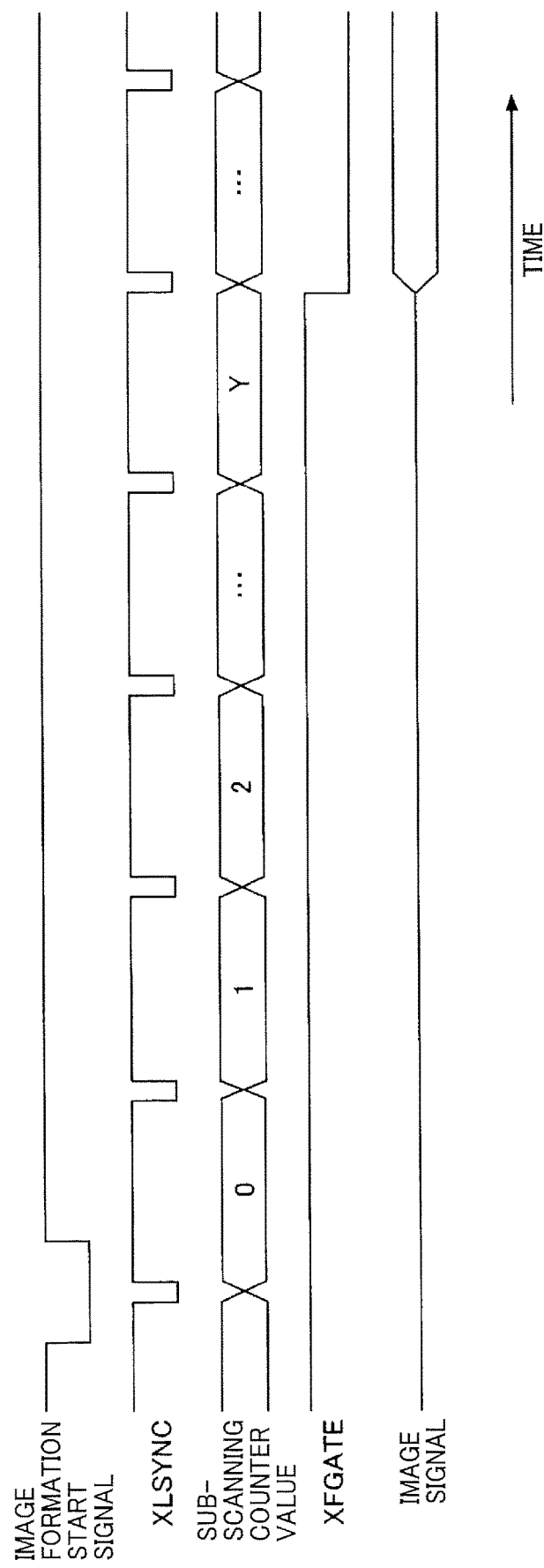
FIG. 9 is a timing chart illustrating writing start control in a sub-scanning direction performed by the image forming apparatus of the first embodiment.

FIG. 9 is a timing chart illustrating an example of writing start position control in the sub-scanning direction performed by the image forming apparatus 100. With the image formation start signal, the sub-scanning counter 261 is reset. That is, the count value of the sub-scanning counter 261 in FIG. 7 is reset. With the counter drive signal XLSYNC, the sub-scanning counter 261 counts up the count value. When the count value of the sub-scanning counter 261 reaches the second set value SET2, the comparator 262 for sub-scanning outputs a signal representing the comparison result. In the present example, the second set value SET2 is represented as "Y."

In response to output from the comparator 262 for sub-scanning of the signal indicating that the count value of the sub-scanning counter 261 has reached the second set value SET2, the sub-scanning control signal generator 260 sets the sub-scanning gate signal XFGATE to low level. The sub-scanning gate signal XFGATE is set to low level during a period corresponding to the width of the toner image in the sub-scanning direction.

An example of a detailed configuration of a line memory LMEM of the image forming apparatus 100 will be described with FIG. 10.

Figure 10:
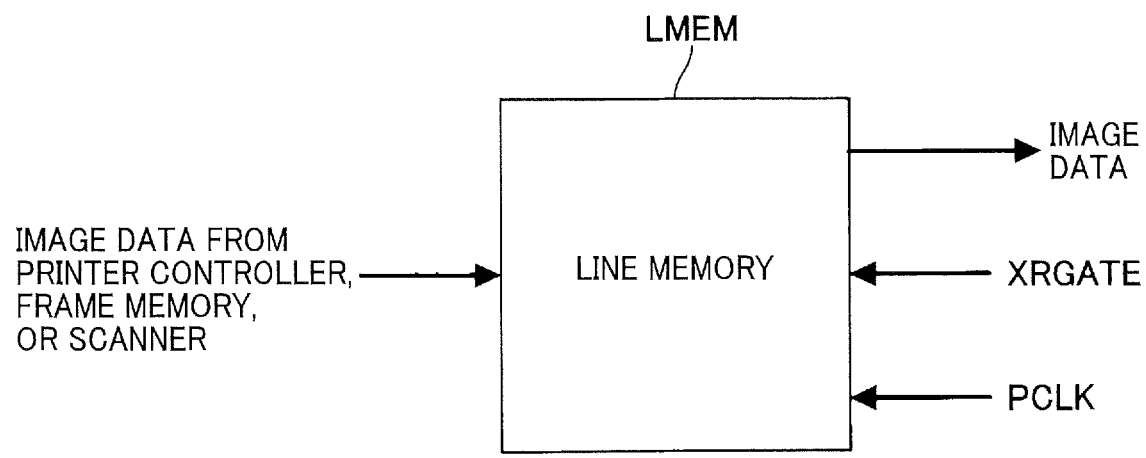
FIG. 10 is a diagram illustrating a configuration example of a line memory in the image forming apparatus of the first embodiment.

FIG. 10 is a diagram illustrating a configuration example of the line memory LMEM of the image forming apparatus 100. For example, the line memory LMEM is disposed at a stage preceding the hardware components near the light beam scanner 21 in FIG. 5.

The image data captured from the printer controller 1, a frame memory, or a scanner, for instance, is stored in the line memory LMEM at the time indicated by the sub-scanning gate signal XFGATE, for example. In synchronization with the pixel clock signal PCLK, the image data stored in the line memory LMEM is output as signals corresponding to a few beams. Further, a signal output from the line memory LMEM is input to the LD controller 223 to control the LD 211 to turn on at the time indicated by the signal.

An example of the functional configuration of the printer controller 1 in the image forming apparatus 100 of the first embodiment will be described with FIG. 11.

Figure 11:
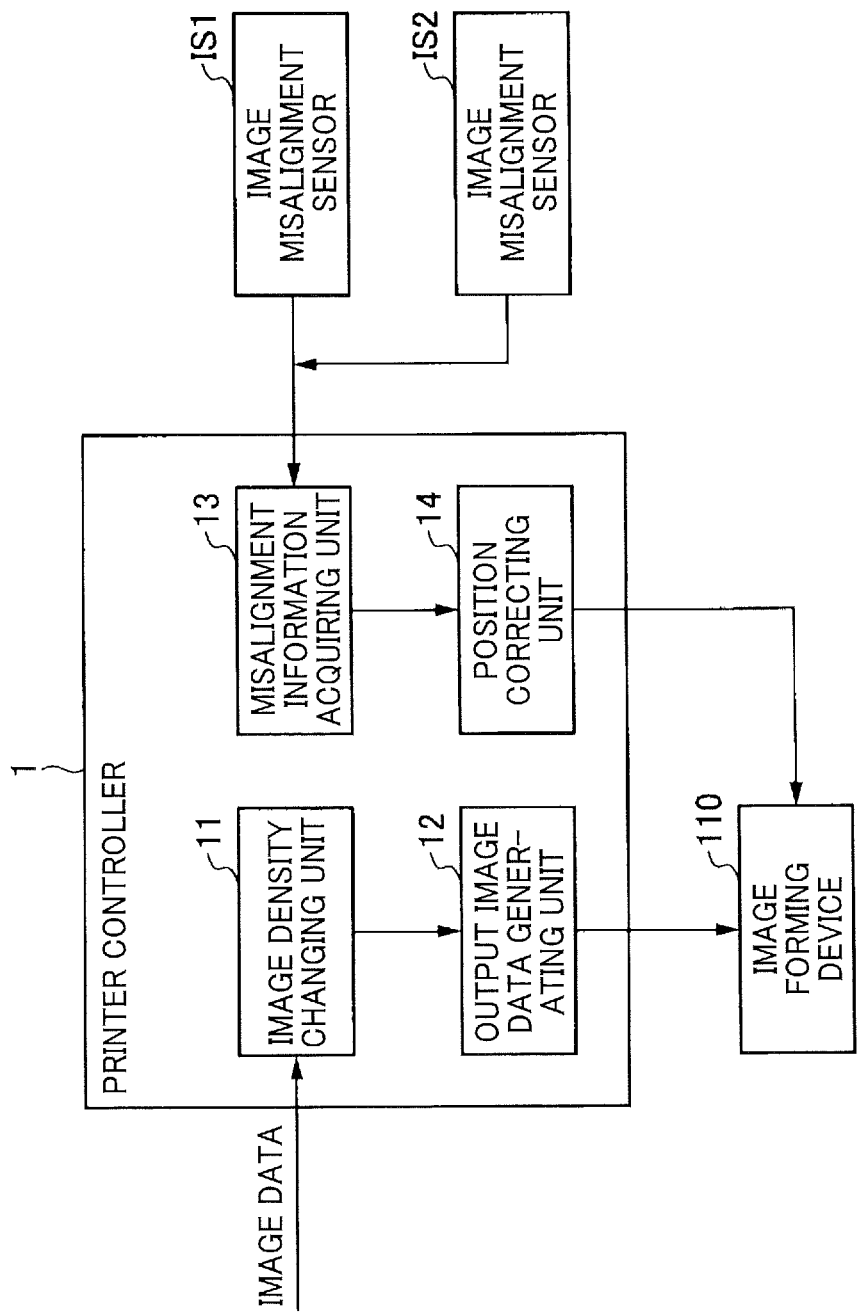
FIG. 11 is a block diagram illustrating an example of the functional configuration of a printer controller in the image forming apparatus of the first embodiment.

FIG. 11 is a block diagram illustrating an example of the functional configuration of the printer controller 1. As illustrated in FIG. 11, the printer controller 1 includes an image density changing unit 11, an output image data generating unit 12, a misalignment information acquiring unit 13, and a position correcting unit 14.

The image density changing unit 11 changes the image density of partial image data (an example of a plurality of partial images) in image data acquired from an external input apparatus such as a PC (an example of a target image) such that the image density of the partial image data is lower than the image density of the correction pattern images formed at certain positions on the recording medium P such as the four corners of the recording medium P. The partial image data is formed peripheral to the correction pattern images. Herein, the image density changing unit 11 is an example of image changing means. The process of changing the image density of the partial image data to be lower than the image density of the correction pattern images is an example of a process of changing a plurality of partial images into a certain state.

The information of the certain positions on the recording medium P for forming the correction pattern images is previously stored in a memory such as a ROM. The image density changing unit 11 acquires the information of the certain positions by referring to the memory. The image density changing unit 11 outputs the changed image data to the output image data generating unit 12.

The output image data generating unit 12 acquires correction pattern image data previously stored in a memory such as a ROM. Then, based on the changed image data input from the image density changing unit 11 and the correction pattern image data, the output image data generating unit 12 generates output image data to be formed on the recording medium P, and outputs the output image data to the image forming device 110.

Based on the output image data, the image forming device 110 performs the image formation on the recording medium P. The image misalignment sensors IS1 and IS2 capture the correction pattern images formed on the recording medium P by the image forming device 110, and output the captured image data to the misalignment information acquiring unit 13.

Based on the input captured image data, the misalignment information acquiring unit 13 acquires misalignment information of the correction pattern images relative to the recording medium P or misalignment information of the correction pattern images on the rear surface of the recording medium P relative to the correction pattern images on the front surface of the recording medium P. The misalignment information acquiring unit 13 outputs the acquired misalignment information to the position correcting unit 14.

The image misalignment sensors IS1 and IS2 may process the captured image data to obtain the misalignment information, and may output the thus-obtained misalignment information to the misalignment information acquiring unit 13.

Based on the misalignment information input from the misalignment information acquiring unit 13, the position correcting unit 14 corrects the position of the target image to be formed relative to the recording medium P or the position of the target image to be formed on the rear surface of the recording medium P relative to the image formed on the front surface of the recording medium P.

More specifically, based on the misalignment information, the position correcting unit 14 calculates correction data for the position and magnification of the target image in the main scanning direction and the position and magnification of the target image in the sub-scanning direction. The position correcting unit 14 then outputs the correction data to each of the polygon motor controller 221, the writing start position controller 222, and the pixel clock generator 225 of the image forming device 110 to set the correction data therein. The position correcting unit 14 is an example of position correcting means.

Based on the correction data, the writing start position controller 222 sets the main scanning gate signal XRGATE for determining the image position in the main scanning direction, and sets the sub-scanning gate signal XFGATE for determining the image position in the sub-scanning direction. Further, based on the correction data, the pixel clock generator 225 sets a pixel clock frequency for determining the image magnification in the main scanning direction. Further, based on the correction data, the polygon motor controller 221 sets the rotation rate of the polygon motor for determining the image magnification in the sub-scanning direction.

In the correction of the position of the target image relative to the recording medium P, the correction result is applied to the image formation on a recording medium P subsequent to the recording medium P having the correction pattern images detected by the image misalignment sensors IS1 and IS2.

In the correction of the position of the image on the rear surface of the recording medium P relative to the image on the front surface of the recording medium P in duplex printing, the correction result is applied to the image formation on the rear surface of the recording medium P having the correction pattern images detected by the image misalignment sensors IS1 and IS2.

If the value of the misalignment information input from the misalignment information acquiring unit 13 is less than a half of a predetermined correction resolution, the correction process by the position correcting unit 14 may be omitted based on a determination that the correction is unnecessary. When the correction is unnecessary due to small misalignment, therefore, the time and effort for executing the correction process are saved.

An example of the correction pattern images formed on the recording medium P will be described with FIG. 12.

Figure 12:
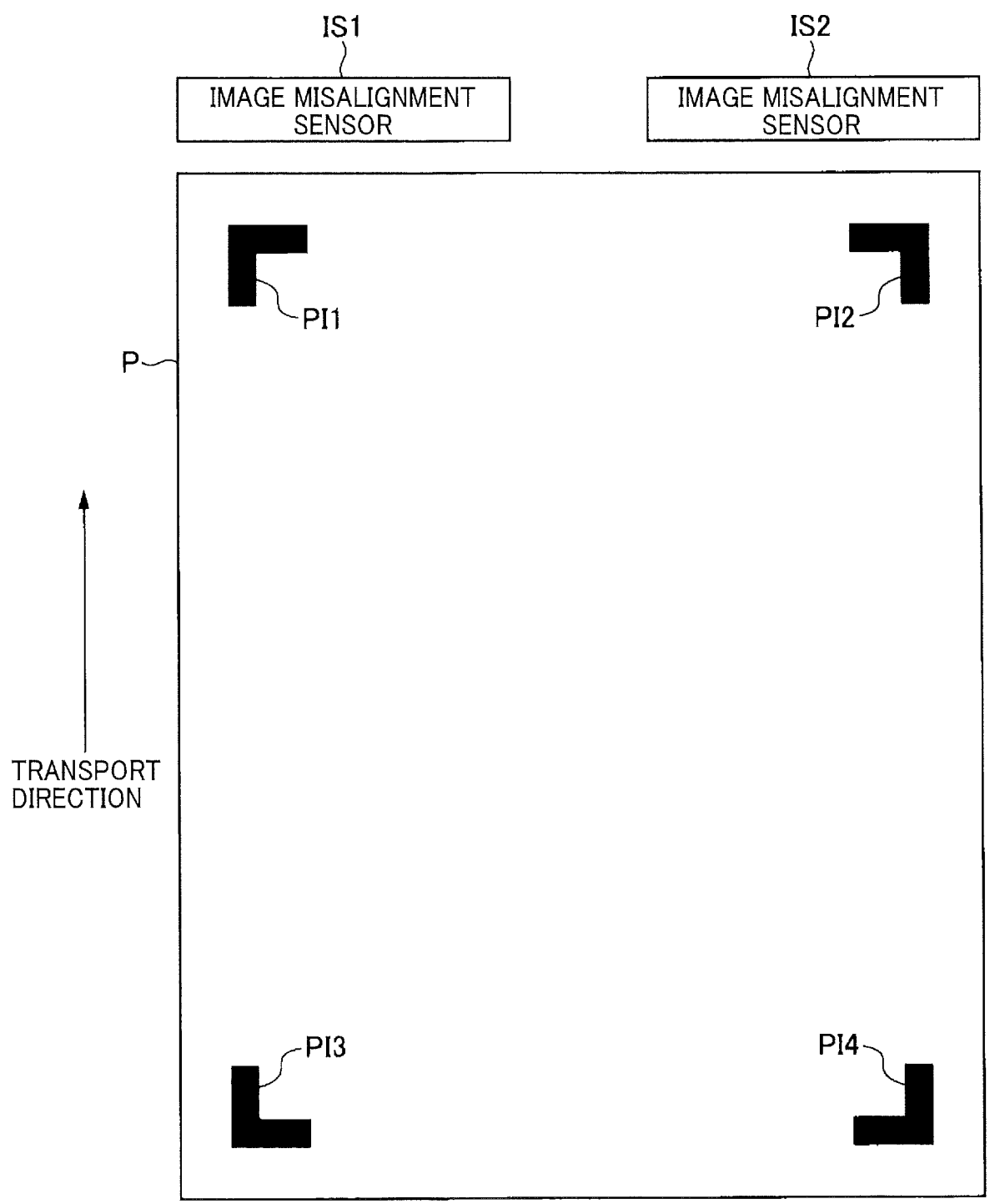
FIG. 12 is a diagram illustrating an example of correction pattern images formed by the image forming apparatus of the first embodiment.

FIG. 12 is a diagram illustrating an example of the correction pattern images. As illustrated in FIG. 12, each of correction pattern images PI1, PI2, PI3, and PI4 is an L-shaped image. The correction pattern images PI1 to PI4 are formed at the four corners of the recording medium P in different orientations.

Further, as illustrated in FIG. 12, the image misalignment sensors IS1 and IS2 are disposed near two opposite ends of the recording medium P in a direction perpendicular to the transport direction of the recording medium P.

The image misalignment sensors IS1 and IS2 first capture the correction pattern images PI1 and PI2, respectively, on the recording medium P being transported. The image misalignment sensors IS1 and IS2 then capture the correction pattern images PI3 and PI4, respectively. Thereby, the captured image data of the correction pattern images PI1 to PI4 is acquired and output to the misalignment information acquiring unit 13 of the printer controller 1.

The pattern of the correction pattern images PI1 to PI4 is not limited to the L-shape pattern. Each of the correction pattern images PI1 to PI4 may be the image of a desired pattern such as a rectangle, square, lateral line, or vertical line pattern, as long as the pattern enables the detection of the image position in the main scanning direction (i.e., a direction perpendicular to the transport direction of the recording medium P) and the image position in the sub-scanning direction (i.e., the transport direction of the recording medium P). Further, the correction pattern images PI1 to PI4 may have different patterns from each other. Preferably, the correction pattern images PI1 to PI4 are formed as small as possible to be inconspicuous.

In the present embodiment, the correction pattern images PI1 to PI4 are captured by the two image misalignment sensors IS1 and IS2. The image misalignment sensors IS1 and IS2, however, may be replaced by a single sensor that is capable of capturing all of the correction pattern images PI1 to PI4 irrespective of a change in the width of the recording medium P.

Examples of the target image formed by the image forming apparatus 100 in an image position correction process will be described with FIGS. 13A, 13B, and 13C.

Figure 13:
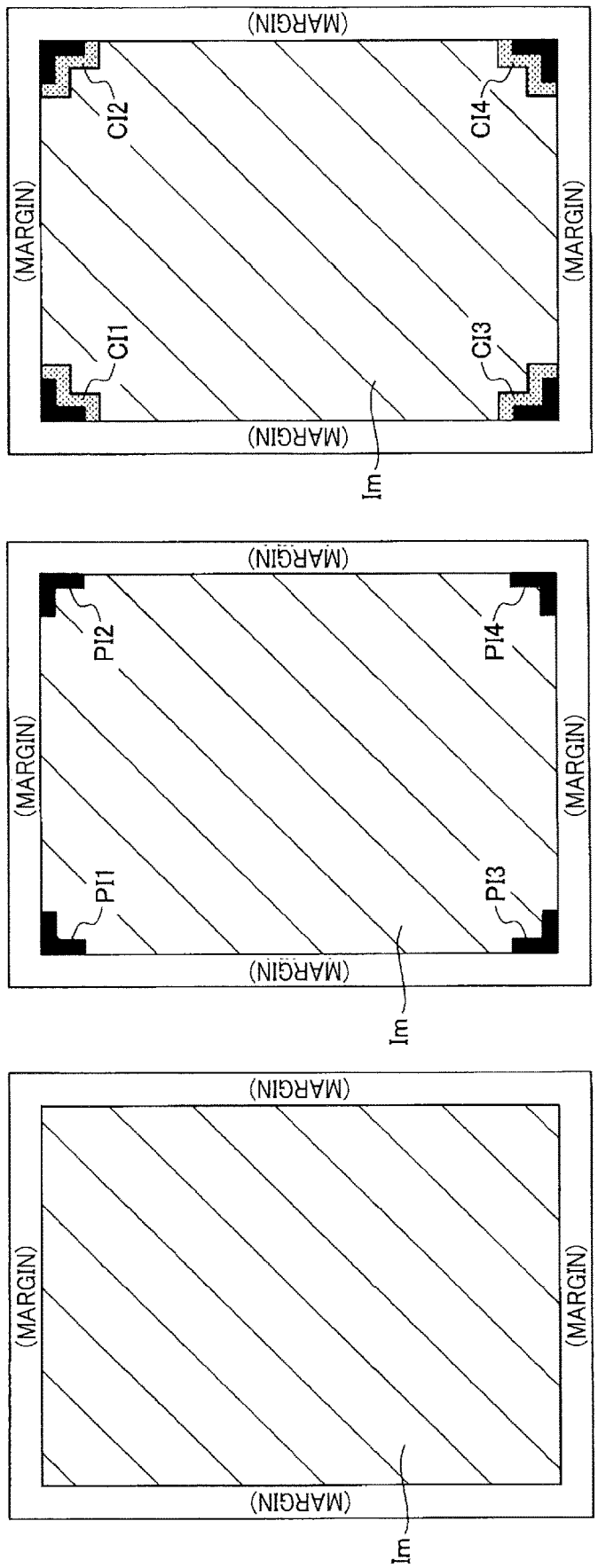
FIGS. 13A to 13C are diagrams illustrating examples of a target image formed by the image forming apparatus of the first embodiment in an image position correction process, FIG. 13A illustrating the target image without the correction pattern images, FIG. 13B illustrating the target image with the correction pattern images, and FIG. 13C illustrating the target image with partial images changed in image density.

FIGS. 13A, 13B, and 13C are diagrams illustrating examples of the target image formed by the image forming apparatus 100 in the image position correction process. FIG. 13A is a diagram illustrating the target image without the correction pattern images. FIG. 13B is a diagram illustrating the target image with the correction pattern images. FIG. 13C is a diagram illustrating the target image with the correction pattern images, in which the partial images peripheral to the correction pattern images are changed in image density. To simplify the description, the partial images peripheral to the correction pattern images will hereinafter be simply referred to as the partial images.

When a target image Im (i.e., an area hatched with diagonal lines) is formed over the entirety of an image formable area in the recording medium P, as illustrated in FIG. 13A, the correction pattern images PI1 to PI4 are formed at the four corners of the recording medium P, as illustrated in FIG. 13B. In this case, the image misalignment sensors IS1 and IS2 may confuse the correction pattern images PI1 to PI4 with the target image Im, failing to accurately detect the correction pattern images PI1 to PI4. For example, if the correction pattern images PI1 to PI4 and the target image Im are the same in color and image density, the image misalignment sensors IS1 and IS2 confuse the correction pattern images PI1 to PI4 with the target image Im, failing to detect the correction pattern images PI1 to PI4 and thus preventing accurate image position correction.

To prevent the confusion between the correction pattern images PI1 to PI4 and the target image Im, parts of the target image Im peripheral to the correction pattern images PI1 to PI4 may be eliminated, i.e., excluded from the image formation. In this case, however, the target image Im formed on the recording medium P is partially missing, and thus the user may fail to properly recognize the formed target image Im owing to the missing information.

As illustrated in FIG. 13C, therefore, the image density changing unit 11 (see FIG. 11) of the present embodiment changes the image density of partial images CI1, CI2, CI3, and CI4 (i.e., dot-hatched areas) in the target image Im to be lower than the image density of the correction pattern images PI1 to PI4. The areas to be reduced in the image density and the extent of reduction in the image density relative to the image density of the correction pattern images PI1 to PI4 are previously determined.

Specifically, when forming the correction pattern images PI1 to PI4 at the highest image density, for example, the image density changing unit 11 sets 1 mm-wide areas peripheral to the correction pattern images PI1 to PI4 as the partial images CI1 to CI4, and changes the image density of the partial images CI1 to CI4 to a half of the image density of the correction pattern images PI1 to PI4.

It is preferable to avoid as much as possible a change in images around the correction pattern images PI1 to PI4. It is therefore preferable to set each of the partial images CI1 to CI4 to the smallest possible area enabling the detection of the correction pattern images PI1 to PI4, and to change the image density of the partial images CI1 to CI4 by the smallest possible amount of change enabling the detection of the correction pattern images PI1 to PI4. If the image density of the partial images CI1 to CI4 is already equal to or lower than a half of the image density of the correction pattern images PI1 to PI4, it is preferable that the image density changing unit 11 does not execute the image density changing process.

The image density changing unit 11 changes the image density of the partial images CI1 to CI4 by changing at least one of the emission amount and the emission time of the laser light emitted to the photoconductor drum 40 (an example of an image bearer or image bearing means) by the LD 211 of the light beam scanner 21. To reduce the image density, the image density changing unit 11 reduces the emission amount or the emission time of the laser light emitted to the photoconductor drum 40 by the LD 211.

Alternatively, the image density changing unit 11 may change the image density of the partial images CI1 to CI4 by spatially decimating the image data. To reduce the image density, the image density changing unit 11 increases the amount of decimation.

An example of the image forming operation performed by the image forming apparatus 100 will be described with FIG. 14.

Figure 14:
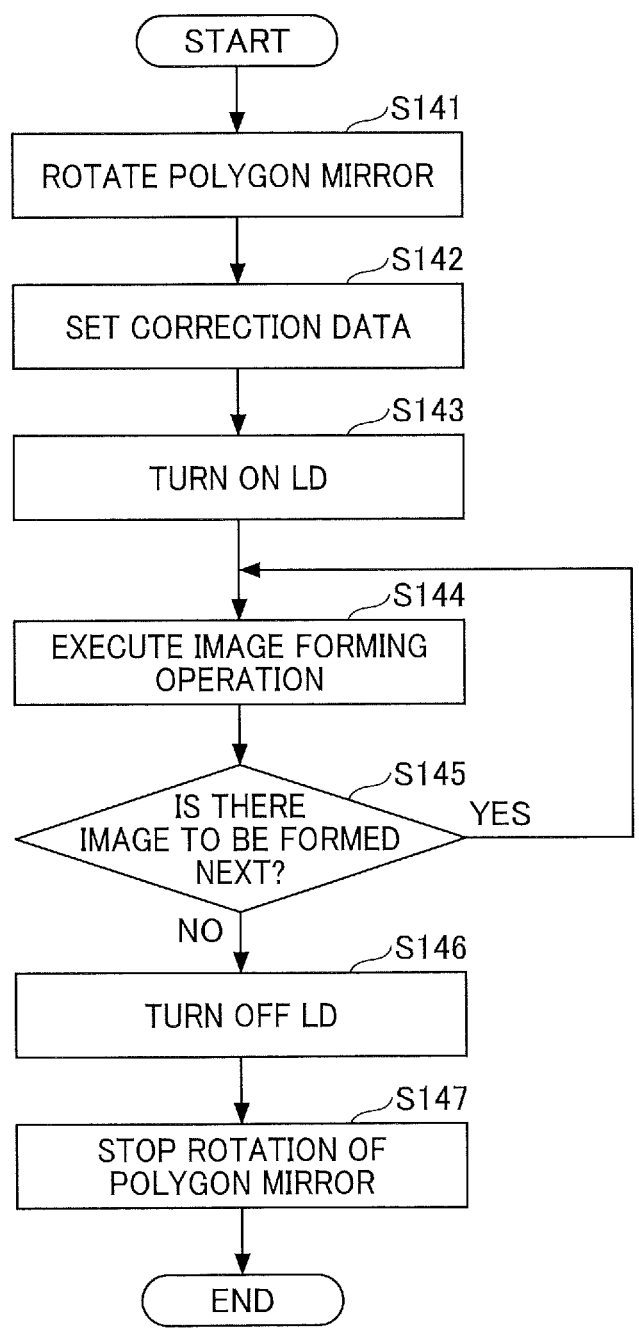
FIG. 14 is a flowchart illustrating an example of an image forming operation performed by the image forming apparatus of the first embodiment.

FIG. 14 is a flowchart illustrating an example of the image forming operation performed by the image forming apparatus 100.

At step S141, in response to pressing of a start button of the operation device of the image forming apparatus 100, the polygon motor controller 221 drives the polygon motor to rotate in accordance with an instruction from the printer controller 1, to thereby rotate the polygon mirror 213 at a predetermined rotation rate.

At step S142, the printer controller 1 reads from the control data memory 229 the correction data for correcting parameters such as the writing start position in the main scanning direction, the writing start position in the sub-scanning direction, and the magnification in the main scanning direction. The printer controller 1 then outputs the correction data to the polygon motor controller 221, the writing start position controller 222, the LD controller 223, the synchronization detection on/off controller 224, and the pixel clock generator 225, which receive the input of the correction data and set therein the correction data.

At step S143, the synchronization detection on/off controller 224 turns on the LD 211, and performs an operation such as an automatic power control (APC) operation to keep the LD 211 on with a predetermined light amount.

At step S144, the polygon motor controller 221, the writing start position controller 222, the LD controller 223, the synchronization detection on/off controller 224, and the pixel clock generator 225 operate in cooperation with each other to execute the image forming operation.

At step S145, the printer controller 1 determines whether there is an image to be formed next.

If it is determined at step S145 that there is an image to be formed next (YES at step S145), the procedure returns to the process of step S144 to execute the image forming operation again. If it is determined at step S145 that there is no image to be formed next (NO at step S145), the procedure proceeds to the process of step S146, in which the LD controller 223 turns off the LD 211 in accordance with an instruction from the printer controller 1.

At step S147, the polygon motor controller 221 stops the rotation of the polygon motor in accordance with an instruction from the printer controller 1 to stop the rotation of the polygon mirror 213, and completes the image forming operation.

The image forming apparatus 100 thus performs the image formation on the recording medium P.

An example of the image misalignment correction process performed by the printer controller 1 will be described with FIG. 15.

Figure 15:
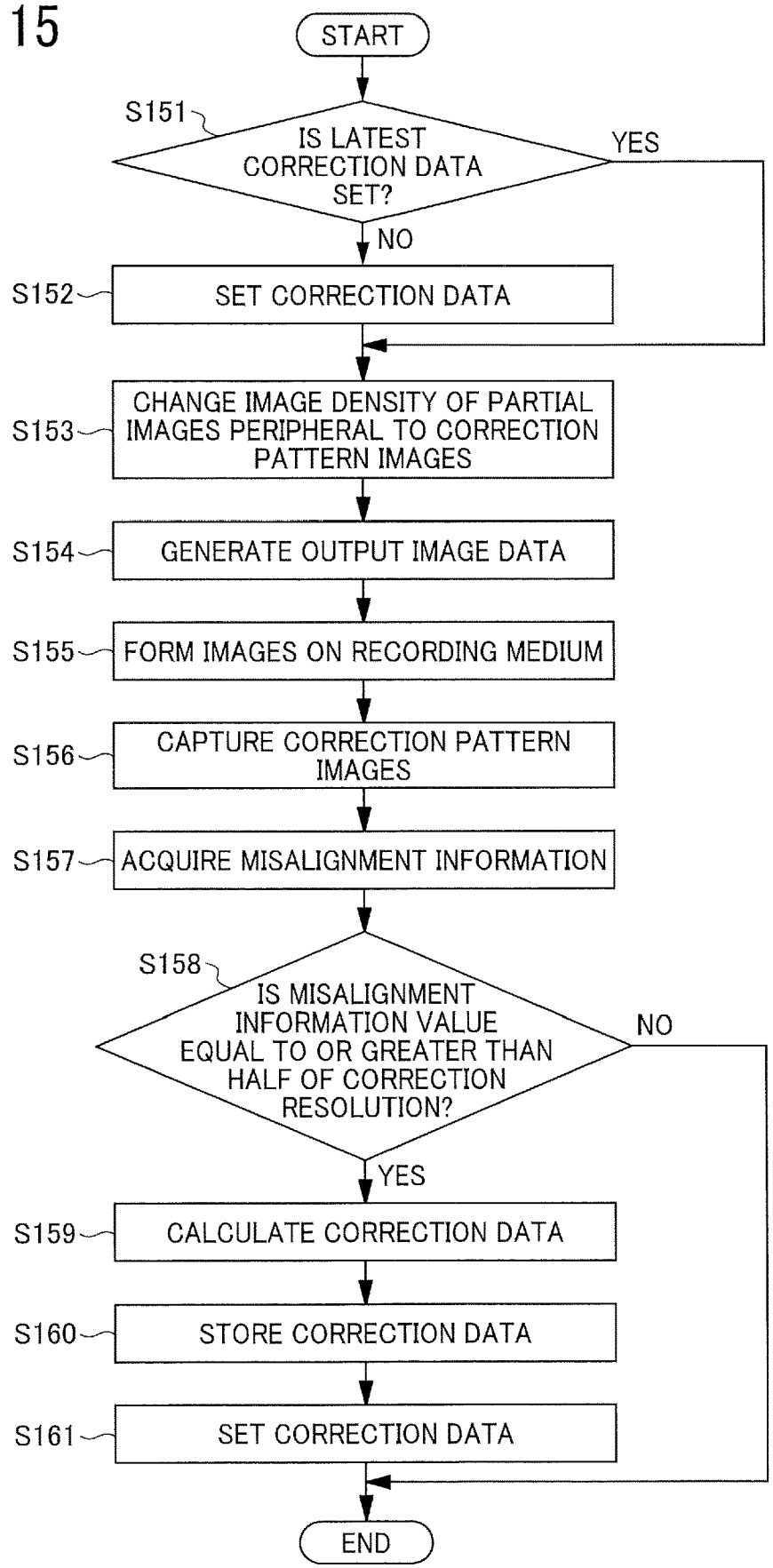
FIG. 15 is a flowchart illustrating an example of an image misalignment correction process performed by the image forming apparatus of the first embodiment.

FIG. 15 is a flowchart illustrating an example of the image misalignment correction process performed by the printer controller 1.

At step S151, the position correcting unit 14 determines whether the latest correction data is set in the polygon motor controller 221, the writing start position controller 222, and the pixel clock generator 225 of the image forming device 110. If the process of setting the correction data has already been performed at power-on of the image forming apparatus 100, for example, the position correcting unit 14 determines that the latest correction data is set in the polygon motor controller 221, the writing start position controller 222, and the pixel clock generator 225.

If it is determined at step S151 that the latest correction data is set in the polygon motor controller 221, the writing start position controller 222, and the pixel clock generator 225 (YES at step S151), the procedure proceeds to the process of step S153. If it is determined at step S151 that the latest correction data is not set in the polygon motor controller 221, the writing start position controller 222, and the pixel clock generator 225 (NO at step S151), the procedure proceeds to the process of step S152, in which the position correcting unit 14 refers to the control data memory 229 and acquires the correction data stored therein. The position correcting unit 14 then sets the acquired correction data in each of the polygon motor controller 221, the writing start position controller 222, and the pixel clock generator 225.

At step S153, the image density changing unit 11 changes the image density of the partial image data in the image data acquired from an external input apparatus such as a PC such that the image density of the partial image data is lower than that of the correction pattern images. The image density changing unit 11 then outputs the changed image data to the output image data generating unit 12.

At step S154, based on the correction pattern image data previously stored in a memory such as a ROM and the changed image data input from the image density changing unit 11, the output image data generating unit 12 generates the output image data to be formed on the recording medium P. The output image data generating unit 12 then outputs the output image data to the image forming device 110.

At step S155, the image forming device 110 performs the image formation on the recording medium P based on the output image data.

At step S156, the image misalignment sensors IS1 and IS2 capture the correction pattern images formed on the recording medium P, and outputs the captured image data to the misalignment information acquiring unit 13.

At step S157, based on the input captured image data, the misalignment information acquiring unit 13 acquires the misalignment information of the correction pattern images relative to the recording medium P or the misalignment information of the correction pattern images on the rear surface of the recording medium P relative to the correction pattern images on the front surface of the recording medium P. The misalignment information acquiring unit 13 then outputs the acquired misalignment information to the position correcting unit 14.

At step S158, the position correcting unit 14 determines whether the value of the misalignment information input from the misalignment information acquiring unit 13 is equal to or greater than a half of a predetermined correction resolution.

If it is determined at step S158 that the value of the input misalignment information is not equal to or greater than a half of the predetermined correction resolution (NO at step S158), the image misalignment correction process is completed based on a determination that the correction is unnecessary.

If it is determined at step S158 that the value of the input misalignment information is equal to or greater than a half of the predetermined correction resolution (YES at step S158), the position correcting unit 14 proceeds to the process of step S159 to calculate, based on the misalignment information, the correction data for the position and magnification of the target image in the main scanning direction and the position and magnification of the target image in the sub-scanning direction.

At step S160, the position correcting unit 14 stores the calculated correction data in the control data memory 229.

At step S161, the position correcting unit 14 outputs the calculated correction data to the polygon motor controller 221, the writing start position controller 222, and the pixel clock generator 225 to set therein the correction data.

The printer controller 1 thus executes the image misalignment correction process.

The image misalignment correction process in FIG. 15 is executed during the image forming operation illustrated in FIG. 14 such as duplex printing. The image misalignment correction process may be automatically executed for each image forming operation, or may be executed in response to an instruction input by the user of the image forming apparatus 100 via the operation device.

In the correction on the rear surface of the recording medium P in duplex printing, the correction data for the front surface and the correction data for the rear surface stored in the control data memory 229 are updated after the correction.

In the image misalignment correction on the front surface of the recording medium P, the correction process may not be executed in real time. For example, the correction process is not executable in real time when the image for the second recording medium P is being formed while the correction pattern images on the first recording medium P are being captured. In this case, the result of capturing the correction pattern images on the front surface of the first recording medium P is not applicable to the front surface of the second recording medium P. Therefore, the correction data is applied to an image that is to be formed on a recording medium P that comes a few recording media P after the second recording medium P. In this case, it is preferable to use the mean of misalignment information values of the correction pattern images formed on the few recording media P.

Further, since the correction data is stored in the control data memory 229 at step S160 in FIG. 15, the image misalignment correction process is executed with the latest correction data.

As described above, in the present embodiment, the image forming apparatus 100 includes the image density changing unit 11, the image forming device 110, and the position correcting unit 14. The image density changing unit 11 changes the image density of the partial images CI1 to CI4, which are included in the target image Im that is to be formed on the recording medium P, to be lower than the image density of the correction pattern images PI1 to PI4. The image forming device 110 forms the target image Im including the partial images CI1 to CI4 changed by the image density changing unit 11 and the correction pattern images PI1 to PI4 on the recording medium P. Based on the captured image data of the correction pattern images PI1 to PI4 formed by the image forming device 110, the position correcting unit 14 corrects the position of the target image Im.

Since the image density of the partial images CI1 to CI4 in the target image Im is changed to be lower than the image density of the correction pattern images PI1 to PI4, the confusion between the partial images CI1 to CI4 and the correction pattern images PI1 to PI4 is prevented without elimination of parts of the target image Im formed on the recording medium P. Consequently, the correction pattern images PI1 to PI4 are accurately detected, enabling accurate image misalignment correction based on the captured image data.

Further, in the present embodiment, the image density changing unit 11 changes at least one of the emission amount and the emission time of the laser light emitted to the photoconductor drum 40 by the LD 211 of the light beam scanner 21, to thereby change the image density of the partial images CI1 to CI4 to be lower than the image density of the correction pattern images PI1 to PI4. Consequently, the image density of the partial images CI1 to CI4 is easily reduced, while the deterioration of the partial images CI1 to CI4 is prevented as much as possible.

The image density changing unit 11 is also capable of easily reducing the image density of the partial images CI1 to CI4 by spatially decimating the target image Im to be formed.

An image forming apparatus 100a of a second embodiment of the present invention will be described. The following description will focus on differences from the first embodiment.

In the second embodiment, an image brightness changing unit 11a (an example of image changing means) changes the image brightness of the partial images CI1 to CI4 in the target image Im to be higher than the image brightness of the correction pattern images PI1 to PI4.

Figure 16:
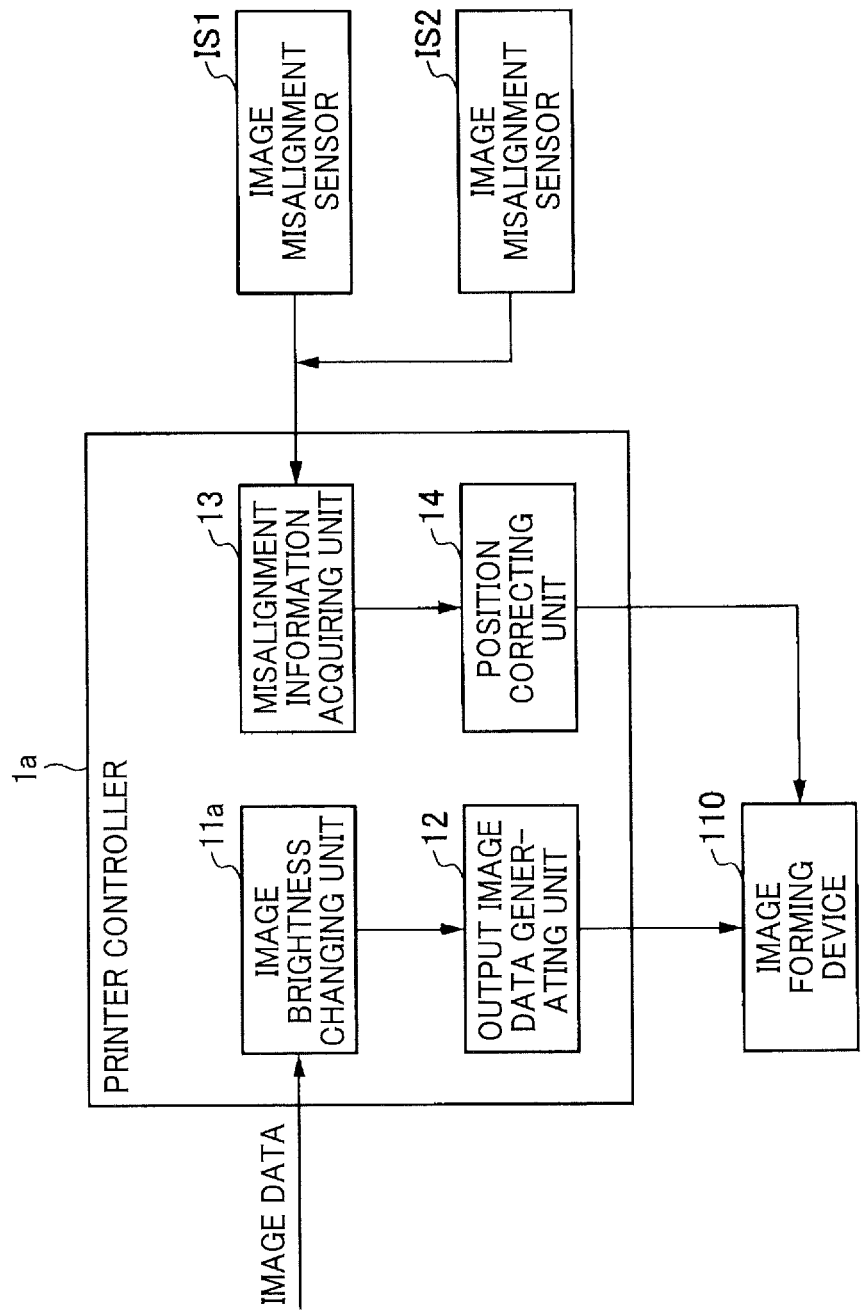
FIG. 16 is a block diagram illustrating an example of the functional configuration of a printer controller in an image forming apparatus of a second embodiment of the present invention.

FIG. 16 is a block diagram illustrating an example of the functional configuration of a printer controller 1a in the image forming apparatus 100a of the second embodiment. As illustrated in FIG. 16, the printer controller 1a includes the image brightness changing unit 11a.

The image brightness changing unit 11a changes the color of the partial images CI1 to CI4 to change the image brightness of the partial images CI1 to CI4. The image brightness changing unit 11a changes the image brightness of the partial images CI1 to CI4 to be higher than the image brightness of the correction pattern images PI1 to PI4. In this case, it is preferable that the image brightness changing unit 11a changes the image brightness of the partial images CI1 to CI4 based on a predetermined image brightness value that minimizes a change in visual color from the original image.

Figure 17:
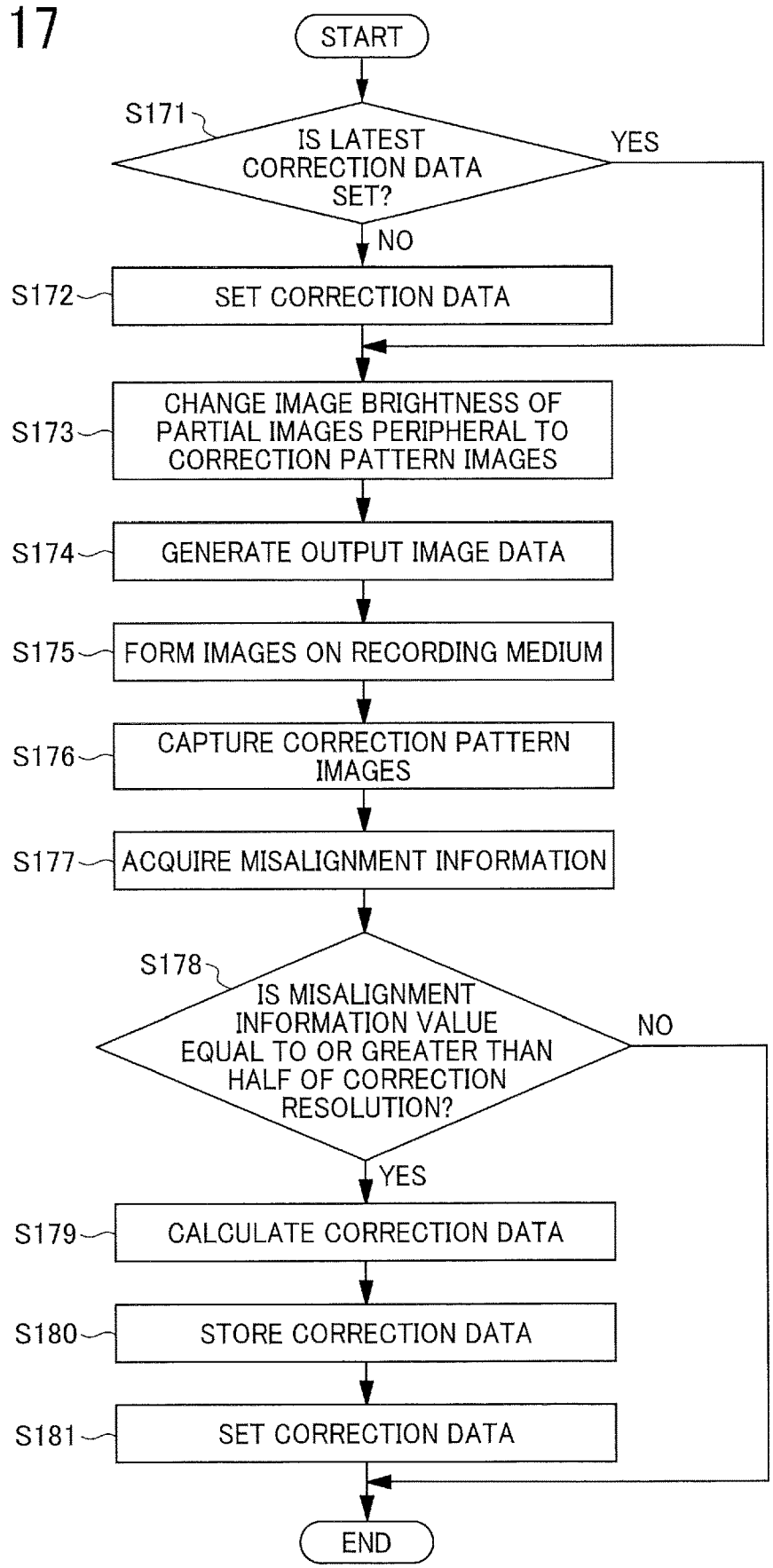
FIG. 17 is a flowchart illustrating an example of an image misalignment correction process performed by the image forming apparatus of the second embodiment.

FIG. 17 is a flowchart illustrating an example of an image misalignment correction process performed by the printer controller 1a of the second embodiment.

At step S173, the image brightness changing unit 11a changes the image brightness of the partial image data in the image data acquired from an external input apparatus such as a PC such that the image brightness of the partial image data is higher than the image brightness of the correction pattern images. The image brightness changing unit 11a then outputs the changed image data to the output image data generating unit 12.

The processes of steps in FIG. 17 except for step S173 are similar to those of steps in FIG. 15 except for step S153, and thus redundant description thereof will be omitted.

In the second embodiment, the image brightness of the partial images CI1 to CI4 in the target image Im is changed to be higher than the image brightness of the correction pattern images PI1 to PI4. Thereby, the confusion between the partial images CI1 to CI4 and the correction pattern images PI1 to PI4 is prevented without elimination of parts of the target image Im formed on the recording medium P. Consequently, the correction pattern images PI to PI4 are accurately detected, enabling accurate image misalignment correction based on the captured image data.

Further, an embodiment of the present invention provides an image forming method. The image forming method includes, for example, changing a plurality of partial images in a target image into a certain state. The target image is to be formed on a recording medium. The plurality of partial images are to be formed peripheral to a plurality of pattern images. Each of the plurality of partial images is to be formed at a certain position on the recording medium. The image forming method further includes, for example, forming the target image including the changed plurality of partial images and the plurality of pattern images on the recording medium, and correcting a position of the target image based on a detection result of the formed plurality of pattern images.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image forming apparatus comprising:
an image forming device configured to form an image on a recording medium; and
a control device configured to control an image forming process, the control device including circuitry configured to
change a plurality of partial images in a tartlet image into a certain state, the target image being an image to be formed on the recording medium, the plurality of partial images being images to be formed peripheral to a plurality of pattern images, and each of the plurality of pattern images being an image to be formed at a certain position on the recording medium,
control the image forming device to form the target image including the changed plurality of partial images and the plurality of pattern images on the recording medium and to detect the formed plurality of pattern images, and
correct a position of the target image based on a detection result of the formed plurality of pattern images.

2. The image forming apparatus of claim 1, wherein the circuitry reduces an image density of the plurality of partial images to be lower than an image density of the plurality of pattern images to change the plurality of partial images into the certain state.

3. The image forming apparatus of claim 1, wherein the image forming device includes
an image bearer, and
an optical writing device configured to irradiate the image bearer with light emitted from a light source to form an electrostatic latent image on the image bearer, the light being based on the target image, and
wherein the circuitry changes at least one of an emission amount and an emission time of the light emitted from the light source to change the plurality of partial images into the certain state.

4. The image forming apparatus of claim 1, wherein the circuitry spatially decimates image data of the target image to change the plurality of partial images into the certain state.

5. The image forming apparatus of claim 1, wherein the circuitry increases image brightness of the plurality of partial images to be higher than image brightness of the plurality of pattern images to change the plurality of partial images into the certain state.

6. The image forming apparatus of claim 5, wherein the circuitry changes a color of the plurality of partial images to change the image brightness of the plurality of partial images.

7. The image forming apparatus of claim 1, wherein the image forming device and the control device are communicably connected to each other.

8. An image forming apparatus comprising:
image changing means for changing a plurality of partial images in a target image into a certain state, the target image being an image to be formed on a recording medium, the plurality of partial images being images to be formed peripheral to a plurality of pattern images, and each of the plurality of partial images being an image to be formed at a certain position on the recording medium;
image forming means for forming the target image including the changed plurality of partial images and the plurality of pattern images on the recording medium;
detecting means for detecting the formed plurality of pattern images; and
position correcting means for correcting a position of the target image based on a detection result of the formed plurality of pattern images.

9. The image forming apparatus of claim 8, wherein the image changing means reduces an image density of the plurality of partial images to be lower than an image density of the plurality of pattern images to change the plurality of partial images into the certain state.

10. The image forming apparatus of claim 8, further comprising:
   image bearing means; and
   optical writing means for irradiating the image bearing means with light emitted from a light source to form an electrostatic latent image on the image bearing means, the light being based on the target image,
   wherein the image changing means changes at least one of an emission amount and an emission time of the light emitted from the light source to change the plurality of partial images into the certain state.

11. The image forming apparatus of claim 8, wherein the image changing means spatially decimates image data of the target image to change the plurality of partial images into the certain state.

12. The image forming apparatus of claim 8, wherein the image changing means increases image brightness of the plurality of partial images to be higher than image brightness of the plurality of pattern images to change the plurality of partial images into the certain state.

13. The image forming apparatus of claim 12, wherein the image changing means changes a color of the plurality of partial images to change the image brightness of the plurality of partial images.

14. An image forming method comprising:
   changing a plurality of partial images in a target image into a certain state, the target image being an image to be formed on a recording medium, the plurality of partial images being images to be formed peripheral to a plurality of pattern images, and each of the plurality of partial images being an image to be formed at a certain position on the recording medium;
   forming the target image including the changed plurality of partial images and the plurality of pattern images on the recording medium;
   detecting the formed plurality of pattern images; and
   correcting a position of the target image based on a detection result of the formed plurality of pattern images.

* * * * *